US012775705B2

(12) United States Patent
Khan et al.

(10) Patent No.: US 12,775,705 B2
(45) Date of Patent: Oct. 27, 2026

(54) DEVICES, SYSTEMS, AND METHODS FOR IDENTIFYING CYBER ASSETS AND GENERATING CYBER RISK MITIGATION ACTIONS BASED ON A DEMOCRATIC MATCHING ALGORITHM

(71) Applicant: Blue Voyant LLC, New York, NY (US)

(72) Inventors: Abdul Khan, New York, NY (US); Brian Keller, New York, NY (US); Peter Meriwether Gleitz, Arnold, MD (US)

(73) Assignee: Blue Voyant LLC, New York, NY (US)

( * ) Notice: Subject to any disclaimer, the term of this patent is extended or adjusted under 35 U.S.C. 154(b) by 33 days.

(21) Appl. No.: 18/860,764

(22) PCT Filed: May 17, 2023

(86) PCT No.: PCT/US2023/022535
§ 371 (c)(1),
(2) Date: Oct. 28, 2024

(87) PCT Pub. No.: WO2023/229894
PCT Pub. Date: Nov. 30, 2023

(65) Prior Publication Data

US 2025/0284799 A1 Sep. 11, 2025

Related U.S. Application Data

(60) Provisional application No. 63/345,679, filed on May 25, 2022.

(51) Int. Cl.
*G06F 21/55* (2013.01)
*G06N 20/10* (2019.01)

(52) U.S. Cl.
CPC .......... *G06F 21/554* (2013.01); *G06N 20/10* (2019.01); *G06F 2221/034* (2013.01)

(58) Field of Classification Search
CPC ............ G06F 21/554; G06F 2221/034; G06F 21/552; G06F 2221/21; G06F 21/577;
(Continued)

(56) References Cited

U.S. PATENT DOCUMENTS 10,440,047 B2 * 10/2019 Vervier .............. G06Q 10/0635
11,310,120 B1 4/2022 Matkowsky
(Continued)

FOREIGN PATENT DOCUMENTS

WO 2023229894 A1 11/2023

OTHER PUBLICATIONS

International Search Report and Written Opinion for corresponding International Application No. PCT/US2023/022535, mailed Aug. 4, 2023.

*Primary Examiner* — Phy Anh T Vu
(74) *Attorney, Agent, or Firm* — K&L Gates LLP

(57) ABSTRACT

A method for identifying cyber assets and implementing cyber risk mitigation actions based on a democratic matching algorithm is disclosed. In one aspect, the method includes executing a plurality of cyber asset identification algorithms to identify a plurality of candidate match pairs, wherein each candidate match pair comprises two cyber assets identified as potential assets of the same entity by at least one of the cyber asset identification algorithms. The method can further include determining a true match probability for each candidate match pair, wherein the true match probability is the probability that the two cyber assets in the candidate match pair are assets of the same entity, and wherein the true match probability is based on which of the cyber asset identification algorithms identified the candidate match pair.

28 Claims, 12 Drawing Sheets

(58) Field of Classification Search
CPC ........ G06F 18/22; G06N 20/10; G06N 20/00; H04L 63/1433; H04L 63/1441
See application file for complete search history.

(56) References Cited

U.S. PATENT DOCUMENTS

| | | | |
|---|---|---|---|
| 2016/0032395 | A1 | 2/2016 | Davicioni et al. |
| 2017/0324766 | A1* | 11/2017 | Gonzalez Granadillo .................. H04L 63/20 |
| 2020/0045070 | A1* | 2/2020 | Liu ........................ G06F 16/285 |
| 2021/0014252 | A1 | 1/2021 | Usher et al. |
| 2021/0105304 | A1 | 4/2021 | Kraning et al. |
| 2021/0248624 | A1* | 8/2021 | Keren .................. G06Q 50/184 |
| 2021/0288995 | A1* | 9/2021 | Attar ........................ H04L 41/22 |
| 2022/0038469 | A1* | 2/2022 | Glazier ............... H04L 63/0236 |
| 2022/0070194 | A1 | 3/2022 | Pon et al. |
| 2022/0150275 | A1 | 5/2022 | McNee et al. |
| 2023/0231867 | A1* | 7/2023 | Rampura Venkatachar ................ G06Q 10/0635 726/25 |
| 2023/0283629 | A1* | 9/2023 | Boyer ................. H04L 63/1416 726/22 |
| 2024/0420264 | A1* | 12/2024 | Nesarikar ............ G06Q 50/265 |

* cited by examiner

400

306

| | $CA_i$ | $CA_j$ | $a_1$ | $a_2$ | ··· | $a_n$ | $P_T$ |
|---|---|---|---|---|---|---|---|
| $306_1$ | $CA_{423}$ | $CA_{74}$ | 1 | 1 | ··· | 0 | 0.91 |
| $306_2$ | $CA_{893}$ | $CA_{982}$ | 0 | 0 | ··· | 1 | 0.23 |
| $306_3$ | $CA_{520}$ | $CA_{139}$ | 1 | 0 | ··· | 0 | 0.15 |
| $306_4$ | $CA_{389}$ | $CA_{89}$ | 0 | 1 | ··· | 1 | 0.81 |
| | ··· | ··· | ··· | ··· | ··· | ··· | ··· |
| $306_n$ | $CA_{235}$ | $CA_{166}$ | 1 | 1 | ··· | 1 | 0.98 |

FIG. 6

702 506 700

| | $d_i$ | $d_j$ | $a_1$ | $a_2$ | ... | $a_n$ | $P_T$ |
|---|---|---|---|---|---|---|---|
| $506_1$ | $d_{seed}$ | $d_1$ | 1 | 1 | ... | 0 | 0.91 |
| $506_2$ | $d_{seed}$ | $d_2$ | 0 | 0 | ... | 1 | 0.23 |
| $506_3$ | $d_{seed}$ | $d_3$ | 1 | 0 | ... | 0 | 0.15 |
| $506_4$ | $d_{seed}$ | $d_4$ | 0 | 1 | ... | 1 | 0.81 |
| | ... | ... | ... | ... | ... | ... | ... |
| $506_n$ | $d_{seed}$ | $d_m$ | 1 | 1 | ... | 1 | 0.98 |

FIG. 9

DEVICES, SYSTEMS, AND METHODS FOR IDENTIFYING CYBER ASSETS AND GENERATING CYBER RISK MITIGATION ACTIONS BASED ON A DEMOCRATIC MATCHING ALGORITHM

CROSS-REFERENCE TO RELATED APPLICATIONS

The present application is related to U.S. Provisional Patent Application No. 63/345,679, titled DEVICES, SYSTEMS, AND METHODS FOR IDENTIFYING CYBER ASSETS AND GENERATING CYBER RISK MITIGATION ACTIONS BASED ON A DEMOCRATIC MATCHING ALGORITHM, filed May 25, 2022, the disclosure of which is incorporated by reference in its entirety herein.

FIELD

The present disclosure is generally related to network security, and, more particularly, is directed to improved devices, systems, and methods for identifying cyber assets and implementing cyber risk mitigation actions based a democratic matching algorithm.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, the present disclosure provides a method for identifying cyber assets and implementing cyber risk mitigation actions. The method can include executing a plurality of cyber asset identification algorithms to identify a plurality of candidate match pairs. Each candidate match pair can include two cyber assets identified as potential assets of the same entity by at least one of the cyber asset identification algorithms. The method can further include determining a true match probability for each candidate match pair. The true match probability is the probability that the two cyber assets in the candidate match pair are assets of the same entity. The true match probability can be based on which of the cyber asset identification algorithms identified the candidate match pair. The method can further include determining, for at least some of the candidate match pairs, that the true match probability is above a predetermined threshold. Additionally, the method can include adding at least one of the cyber assets from each candidate match pair having a true match probability above the predetermined threshold to a cyber asset database corresponding to the entity used to identify the match pair. In some aspects, the method can include generating a cyber risk mitigation action based on the cyber asset database.

In various aspects, the present disclosure provides a method for identifying cyber assets and generating cyber risk mitigation actions. The method can include selecting a subject entity for evaluation and executing a plurality of domain identification algorithms to identify a plurality of candidate domains. Each candidate domain can be identified as a potential asset of the subject entity by at least one of the domain identification algorithms. The method can further include determining a true match probability for each candidate domain. The true match probability is the probability that the candidate domain is an asset of the subject entity.

The true match probability can be based on which of the domain identification algorithms identified the candidate domain. The method can further include classifying the candidate domains having a true match probability above a predetermined threshold as associated domains, wherein each associated domain is considered to be an asset of the subject entity. In some aspects, the method can include generating an entity asset database for the subject entity based on the associated domains and generating a cyber risk mitigation based on the entity asset database.

In various aspects, the present disclosure provides a server. The server can be configured to identify cyber assets and implement cyber risk mitigation based on a democratic matching algorithm. The server can include a processer and a memory configured to generate a footprinting module and a risk mitigation module. The footprinting module can include a democratic matching module and a plurality of cyber asset identification modules. The memory can store instructions that, when executed by the processor, cause the processor to execute, via the cyber asset identification modules, a plurality of cyber asset identification algorithms to identify a plurality of candidate match pairs. Each candidate match pair can include two cyber assets identified by at least one of the cyber asset identification algorithms as potential assets of the same entity. The memory can further store instructions that, when executed by the processor, cause the processor to determine, via the democratic matching module, a true match probability for each candidate match pair. The true match probability is the probability that the two cyber assets in the candidate match pair are assets of the same entity. True match probability can be based on which of the cyber asset identification algorithms identified the candidate match pair. The memory can further store instructions that, when executed by the processor, cause the processor to determine, via the democratic matching module, for at least some of the candidate match pairs, that the true match probability is above a predetermined threshold and add, via the footprinting module, at least one of the cyber assets from each candidate match pair having a true match probability above the predetermined threshold to a cyber asset database corresponding to the entity used to identify the match pair. The memory can further store instructions that, when executed by the processor, cause the processor to generate, via the risk mitigation module, a cyber risk mitigation based on the cyber asset database.

These, and other objects, features, and characteristics of the present disclosure, as well as the methods of operation, and functions of the related elements of structure, and the combination of parts, and economies of manufacture, will become more apparent upon consideration of the following description, and the appended claims with reference to the accompanying drawings, all of which form a part of this specification, wherein like reference numerals designate corresponding parts in the various figures. It is to be expressly understood, however, that the drawings are for the purpose of illustration, and description only, and are not intended as a definition of the limits of the disclosure.

BRIEF DESCRIPTION OF THE DRAWINGS

Various features of the aspects described herein are set forth with particularity in the appended claims. The various aspects, however, both as to organization, and methods of operation, together with advantages thereof, may be understood in accordance with the following description taken in conjunction with the accompanying drawings as follows:

FIG. 6 illustrates an example of a match table employed by the method for identifying cyber assets illustrated in FIG. 5, in accordance with at least one non-limiting aspect of the present disclosure;

FIG. 9 illustrates an example of a match table employed by the method for identifying domains illustrated in FIG. 7, in accordance with at least one non-limiting aspect of the present disclosure;

Figure 1:
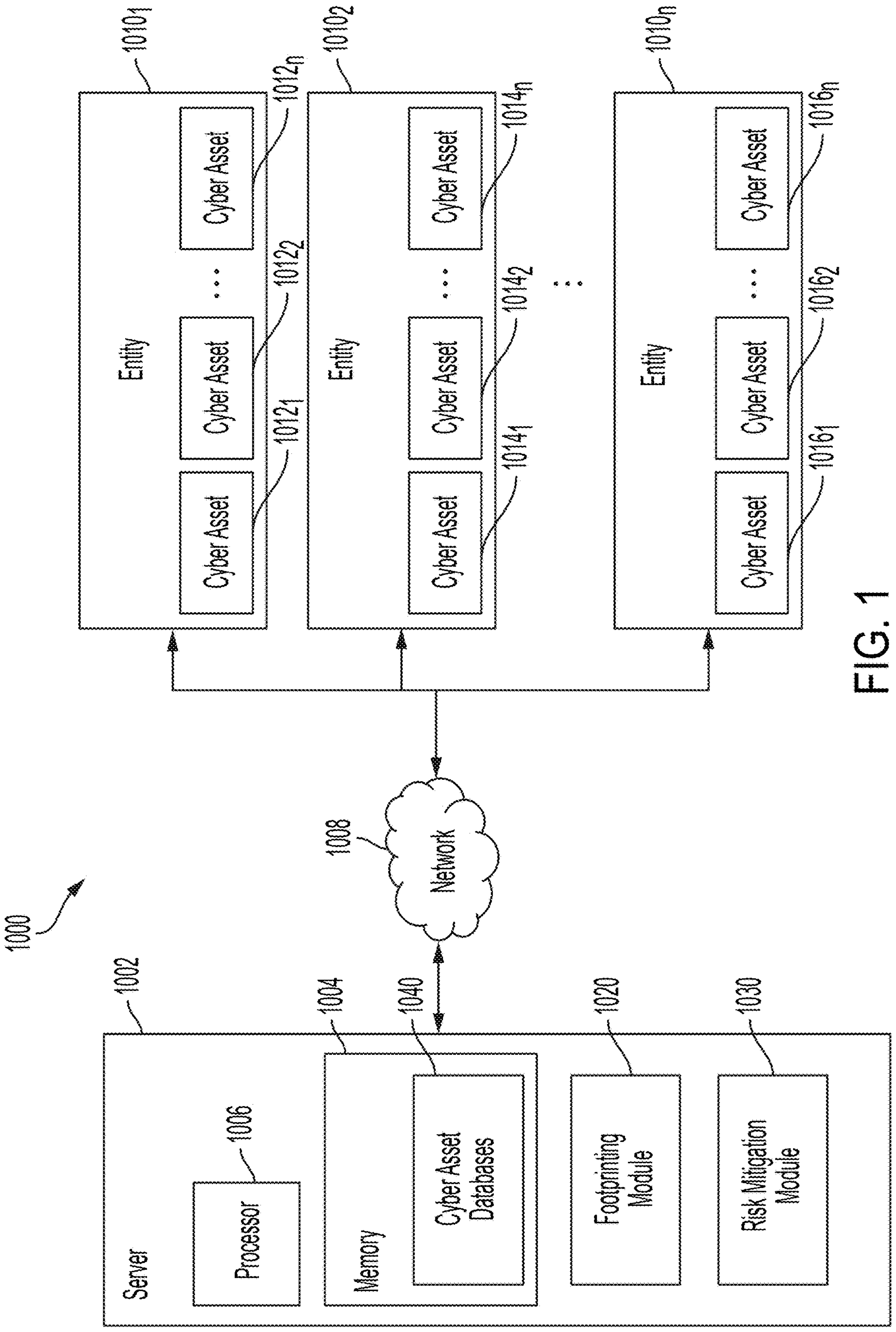
FIG. 1 illustrates a diagram of a system configured for identifying cyber security assets and generating cyber risk mitigation actions for a plurality of entities, in accordance with at least one non-limiting aspect of the present disclosure.

Corresponding reference characters indicate corresponding items throughout the several views. The exemplifications set out herein illustrate various aspects of the present disclosure, in one form, and such exemplifications are not to be construed as limiting the scope of the present disclosure in any manner.

DETAILED DESCRIPTION

The Applicant of the present application owns the following U.S. Provisional patent applications, the disclosure of each of which is herein incorporated by reference in its entirety:

- U.S. Provisional Patent Application No. 63/341,264 titled DEVICES, SYSTEMS, AND METHODS FOR SUMMARIZING ANALYTIC OBSERVATIONS, filed on May 12, 2022;

- U.S. Provisional Patent Application No. 63/344,305 titled DEVICES, SYSTEMS, AND METHODS FOR INGESTING & ENRICHING SECURITY INFORMATION TO AUTONOMOUSLY SECURE A PLURALITY OF TENANT NETWORKS, filed on May 20, 202;
- U.S. Provisional Patent Application No. 63/345,679 titled DEVICES, SYSTEMS, AND METHODS FOR IDENTIFYING CYBER ASSETS AND GENERATING CYBER RISK MITIGATION ACTIONS BASED ON A DEMOCRATIC MATCHING ALGORITHM, filed on May 25, 2022
- International Patent Application No. PCT/US2022/072739, titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS, filed on Jun. 3, 2022;
- International Patent Application No. PCT/US2022/072743, titled DEVICES, SYSTEMS, AND METHODS FOR STANDARDIZING & STREAMLINING THE DEPLOYMENT OF SECURITY INFORMATION & EVENT MANAGEMENT ARTIFACTS FOR MULTIPLE TENANTS, filed on Jun. 3, 2022;
- U.S. Provisional Patent Application No. 63/365,819 titled DEVICES, METHODS, AND SYSTEMS FOR GENERATING A HIGHLY-SCALABLE, EFFICIENT COMPOSITE RECORD INDEX, filed on Jun. 3, 2022
- U.S. Provisional Patent Application No. 63/353,992 titled DEVICES, SYSTEMS, AND METHODS FOR CATEGORIZING, PRIORITIZING, AND MITIGATING CYBER SECURITY RISKS, filed on Jun. 21, 2022;
- U.S. Provisional Patent Application No. 63/366,903 titled DEVICES, SYSTEMS, AND METHOD FOR GENERATING AND USING A QUERYABLE INDEX IN A CYBER DATA MODEL TO ENHANCE NETWORK SECURITY, filed on Jun. 23, 2022;
- U.S. Provisional Patent Application No. 63/368,567 titled DEVICES, SYSTEMS, AND METHODS FOR UTILIZING A NETWORKED, COMPUTER-ASSISTED, THREAT HUNTING PLATFORM TO ENHANCE NETWORK SECURITY, filed on Jul. 15, 2022;
- U.S. Provisional Patent Application No. 63/369,582 titled AUTONOMOUS THREAT SCORING AND SECURITY ENHANCEMENT, filed on Jul. 27, 2022;
- U.S. Provisional Patent Application No. 63/377,304, titled DEVICES, SYSTEMS, AND METHODS FOR CONTINUOUSLY ENHANCING THE IMPLEMENTATION OF CODE CHANGES VIA ENRICHED PIPELINES, filed on Sep. 27, 2022;
- International Patent Application No. PCT/US2022/082167 titled DEVICES, SYSTEMS, AND METHODS FOR PROVISIONING AND UPDATING SECURITY INFORMATION & EVENT MANAGEMENT ARTIFACTS FOR MULTIPLE TENANTS, filed on Dec. 21, 2022;
- International Patent Application No. PCT/US2022/082173 titled DEVICES, SYSTEMS, AND METHODS FOR STREAMLINING AND STANDARDIZING THE INGEST OF SECURITY DATA ACROSS MULTIPLE TENANTS, filed on Dec. 21, 2022;
- International Patent Application No. PCT/US2023/061069 titled DEVICES, SYSTEMS, AND METHODS FOR REMOTELY MANAGING ANOTHER ORGANIZATION'S SECURITY ORCHESTRATION, AUTOMATION, AND RESPONSE, filed on Jan. 23, 2023;

International Patent Application No. PCT/US2023/062894, titled DEVICES, SYSTEMS, AND METHODS FOR IDENTIFYING CYBER ASSETS AND GENERATING CYBER RISK MITIGATION ACTION BASED ON DOMAIN REDIRECTS, filed on Feb. 20, 2023;

Numerous specific details are set forth to provide a thorough understanding of the overall structure, function, manufacture, and use of the aspects as described in the disclosure, and illustrated in the accompanying drawings. Well-known operations, components, and elements have not been described in detail so as not to obscure the aspects described in the specification. The reader will understand that the aspects described, and illustrated herein are non-limiting aspects, and thus it can be appreciated that the specific structural, and functional details disclosed herein may be representative, and illustrative. Variations, and changes thereto may be made without departing from the scope of the claims.

Before explaining various aspects of the systems, and methods disclosed herein in detail, it should be noted that the illustrative aspects are not limited in application or use to the details of disclosed in the accompanying drawings, and description. It shall be appreciated that the illustrative aspects may be implemented or incorporated in other aspects, variations, and modifications, and may be practiced or carried out in various ways. Further, unless otherwise indicated, the terms, and expressions employed herein have been chosen for the purpose of describing the illustrative aspects for the convenience of the reader, and are not for the purpose of limitation thereof. For example, it shall be appreciated that any reference to a specific manufacturer, software suite, application, or development platform disclosed herein is merely intended to illustrate several of the many aspects of the present disclosure. This includes any, and all references to trademarks. Accordingly, it shall be appreciated that the devices, systems, and methods disclosed herein can be implemented to enhance any software update, in accordance with any intended use, and/or user preference.

As used herein, the term "server" may refer to or include one or more computing devices that are operated by or facilitate communication, and processing for multiple parties in a network environment, such as the Internet or any public or private network. Reference to "a server" or "a processor," as used herein, may refer to a previously-recited server, and/or processor that is recited as performing a step or function, a different server, and/or processor, and/or a combination of servers, and/or processors.

As used herein, the term "entity" may refer to or include a company, a business-related organization, a non-profit organization, a governmental organization, a charitable organization, an educational institution, or any other type of organization or individual that may own or have an association with a collection of cyber assets. Reference to a "cyber asset," as used herein, may refer to a computing device, a network, hardware, software, data, information, or any other type of information technology-related component, label, or identifier for switching, signaling, or routing such as, for example, a domain, an Internet Protocol (IP) address, or a shared and/or dynamic asset.

As used herein, the terms "domain" and "domain name" may refer to or include a string that identifies or is otherwise associated with a network, computing device, or other resource in communication with the Internet, such as, for example a server, personal computer, website, or other service communicated via the Internet. In some aspects, as used herein, "domain" and "domain name" may generally refer to domain names as they are described in *Domain Names—Implementation and Specification*, Network Working Group (November 1987), the disclosure of which is incorporated by reference herein.

Entities generally have a basic need to understand and manage cyber security risks. More specifically, entities have a need to understand and manage cyber security risks related to their cyber assets. For example, an entity can have an Internet presence—a large collection of cyber assets that are used for Internet-related communications. One or more of these cyber assets may be configured such that the entity is potentially exposed to cyber threats. Cyber threats can include unwanted or malicious attempts to gain access to the entity's networks, data, and/or other information. Cyber threats may also include malicious denial of usage of cyber assets by their rightful owners, for example denial-of-service attacks, or ransomware. Thus, in order to identify potential exposure to cyber threats, and to take action against such threats, entities and/or their risk evaluators and auditors have a need to identify their cyber assets and how they are configured.

In order to further improve the management of cyber threats and other security risks, entities also have a need to identify and understand the cyber assets of other entities. This need may arise because the communication between entities could lead to threat exposure or perhaps because the cyber security risks of an entity could cause a catastrophic service failure outside the realm of the Internet with adverse implications for partner entities. For example, a first entity may use its cyber assets to communicate with the cyber assets of another entity. If the cyber assets of the other entity are susceptible to cyber threats, then communicating with these assets could put the first entity at risk. Therefore, entities have a need not only to identify and understand their own cyber assets, but also to identify and understand the risks posed by cyber assets of other entities.

However, the large-scale identification of entities and their cyber assets can be a complex, time-consuming, and resource-intensive process. To start, it can be difficult to simply distinguish entities from one another because they often share the same name. For example, an Internet search for the company "Island Realty" may identify companies with that name in Surf City NJ, Isle of Palms SC, Jamestown RI, Orange Park, FL, Grosse Ile MI, Grand Isle LA, and other locations across the globe. Moreover, entities often share similar names. For example, a company called "The Island Realty" located in Fisher's Island Fl, could be mistaken for the various companies doing business under the name "Island Realty" listed above. Thus, in order to be able to classify a cyber asset (e.g., the domain name "islandrealty.com") as belonging to a particular entity, there is a need for methods, systems, and devices that reliably identify entities and distinguish them from each other.

Moreover, once a particular entity is identified, it can be complex and resource-intensive to identify some or all the cyber assets that are owned and/or controlled by that entity. For example, a type of cyber asset that can be important to identify when analyzing cyber risk are domains. Domains, along with IP addresses, are generally used as the primary identifiers of networks and other types of assets in IT systems. However, domains can be especially difficult to identify and classify as being owned or otherwise associated with an entity, in part, because of the overwhelming number of domains that are available for investigation. As of the second quarter of 2021, Verisign reported the Internet contained at least 367,000,000 registered domains. See Verisign, 18 Domain Name Industry Brief 3, 2 (September 2021), the disclosure of which is incorporated by reference herein. Each of these domains can potentially belong to a particular entity that is under evaluation.

Analyzing each of these domains to identify a potential association with a particular entity is a task of such scope, scale, and complexity that it cannot be practically performed by the human mind. Moreover, difficulty can arise when analyzing domains for a potential association with an entity because domain registration information can often be incomplete, incorrect, or purposely redacted. As an example, the registration information for a particular domain may only include a name and a phone number, but no other information that could be used to confirm an association with a particular entity. As another example, the name, phone number, or other information included in the registration information may contain spelling errors or typos (e.g. "Willims Computing" [sic] instead of "Williams Computing"; "123-465-7890" instead of "123-456-7890"). Thus, a security analyst tasked with identifying, analyzing, and/or managing the cyber assets of multiple entities is prone to misclassifying and/or never discovering relevant domain names. Moreover, contracting a security analyst to perform this task can be costly because of the effort and complexity involved.

To address these issues, various rule-based algorithms can be used to discover cyber assets (e.g., domains) and determine if a discovered cyber asset is owned or otherwise associated with a particular entity. As one example, a simple algorithm that searches and analyzes Internet registration databases for domains registered to a particular entity may be used to identify domains potentially owned by that entity. As another example, more complex cyber asset identification algorithms may be used, such as the domain redirection techniques described in the aforementioned International Patent Application No. PCT/US2023/062894, titled DEVICES, SYSTEMS, AND METHODS FOR IDENTIFYING CYBER ASSETS AND GENERATING CYBER RISK MITIGATION ACTION BASED ON DOMAIN REDIRECTS, filed on Feb. 20, 2023, which is herein incorporated by reference in its entirety. As to be expected, different cyber asset identification algorithms can exhibit varying levels of accuracy and performance. For example, a first algorithm may identify some of the cyber assets belonging to an entity with a high level of accuracy but may also fail to identify several of the cyber assets belonging to that entity. A second algorithm may identify more cyber assets belonging to the entity than the first algorithm but may also erroneously associate a large number of cyber assets with the entity. Thus, it may be desirable to employ multiple cyber asset identification algorithms to take advantage of the benefits that each algorithm may offer. However, when different cyber asset identification algorithms provide different results, it can be difficult to determine which of the identified cyber assets actually belong to a particular entity and which cyber assets have been misclassified by one or more of the algorithms.

Misclassifying and omitting cyber assets during the investigation of an entity can be detrimental to the cyber security risk analysis and mitigation process. As explained above, cyber assets may be configured such that they are potentially exposed to cyber threats. If a cyber asset (e.g., a domain) of a particular entity is exposed to a cyber threat but is also never identified as belonging to the entity, then the cyber security evaluation of that entity could be inaccurate and incomplete. Moreover, because the exposed cyber asset is never identified, it may be difficult or impossible for the evaluated entity, or other entities potentially communicating or otherwise doing business with the evaluated entity, to implement an action to mitigate the potential cyber threat. For example, it may be desirable to implement a configuration change in response to determining that a cyber asset is exposed to a cyber threat. However, if the cyber asset is never identified, the configuration change may not be implemented. Accordingly, there is a need for improved devices, systems, and methods for reliably identifying entities with an Internet presence, reliably identifying cyber assets associated with particular entities, and generating cyber risk mitigation actions based on the identified cyber assets. Such enhancements could reduce the resources required to identify the cyber assets belonging to a particular entity while also improving accuracy. Additionally, such enhancements could allow for the automated implementation of cyber risk mitigation actions.

The present disclosure presents devices, systems, and methods for reliably identifying entities with an Internet presence, identifying cyber assets (e.g., domains) associated with particular entities, and/or implementing cyber risk mitigation actions based on the identified cyber assets. These devices, systems, and methods can provide many technological benefits, such as, for example: (1) more accurately identifying cyber assets associated with particular entities, in a non-routine way, by employing a plurality of cyber asset identification algorithms to identify a plurality of candidate match pairs each including two cyber assets potentially belonging to the same entity, determining a true match probability for each candidate match pair based on which of the cyber asset identification algorithms identified the candidate match pair, and generating entity-specific cyber asset databases by adding cyber assets of the candidate match pairs with a true match probability above a predetermined threshold to a cyber asset database corresponding to the entity used to identify the match pair; (2) using machine learning to provide the technological advantage of determining accuracy factor(s) for each of the cyber asset identification algorithms to allow for more accurate cyber asset classification; (3) executing a plurality of different cyber asset (e.g., domain) identification algorithms to discover which of the hundreds of millions of existing domains are potential assets of a particular entity—thereby identifying cyber assets associated with an entity at a scale and complexity not practically performed by the human mind; and/or (4) integrating the generation of the database(s) comprising the cyber assets into a practical application by generating an automated cyber risk mitigation action based on the database(s). The devices, systems, and methods described here can also provide technological benefits by enabling the rapid prototype development and use of various cyber asset identification algorithms, that may not necessarily need to be completely optimized and/or accurate, by incorporating the results of such algorithms into the true match probabilities determined by the democratic matching algorithms described herein.

Referring now to FIG. 1, a diagram of a system 1000 configured for identifying cyber assets and generating cyber risk mitigation actions across multiple entities is illustrated, in accordance with at least one non-limiting aspect of the present disclosure. The system 1000 can include a cyber risk management provider server 1002 comprising a memory 1004 and a processor 1006. In various aspects, cyber risk management provider server 1002 can comprise the computer system 9000 and the various components thereof (e.g., processor 1006 can be similar to processor(s) 9004, memory 1004 can be similar to main memory 9006, etc.), as will be discussed in further reference to FIG. 12. The memory 1004 may be configured to store instructions that, when executed by the processor 1006, carry out various aspects of the methods 100, 200, 300, 500, 800 and/or 900 as described below with respect to FIGS. 2-3 and 5-11. For example, the memory 1004 can include instructions executable by the processor 1006 to generate a footprinting module 1020 to perform one or more of the methods 100, 300, 500, and 800. The memory 1004 can similarly include instructions executable by the processor 1006 to generate to generate a risk mitigation module 1030 to perform one or more of the methods 200 and 900. The cyber risk management provider server 1002 can be communicably coupled, via network 1008, to a plurality of entities $\mathbf{1010}_1$, $\mathbf{1010}_2$ . . . $\mathbf{1010}_n$. Each entity $\mathbf{1010}_1$, $\mathbf{1010}_2$ . . . $\mathbf{1010}_n$ of the plurality can represent a tenant (e.g., a customer organization) contracting with the cyber risk management provider for cyber security services and/or an entity that may be evaluated by the cyber risk management provider for cyber threats. According to a non-limiting aspect of FIG. 1, the network 1008 can include any variety of wired, long-range wireless, and/or short-range wireless networks. For example, the network 1008 can include an internal network, a Local Area Network (LAN), WiFi®, cellular networks, near-field communication (hereinafter "NFC"), amongst others.

In further reference to FIG. 1, each entity $\mathbf{1010}_1$, $\mathbf{1010}_2$ . . . $\mathbf{1010}_n$ of the plurality can host and/or be associated with one or more instances of one or more cyber assets 1012, 1014, 1016 (sometimes referred to herein as clients 1012, 1014, 1016). For example, a first entity $\mathbf{1010}_1$ can include one or more machines implementing or otherwise associated with one or more cyber assets $\mathbf{1012}_1$, $\mathbf{1012}_2$ . . . $\mathbf{1012}_n$, a second entity $\mathbf{1010}_2$ can include one or more machines implementing or otherwise associated with one or more cyber assets $\mathbf{1014}_1$, $\mathbf{1014}_2$ . . . $\mathbf{1014}_n$, and/or a third entity $\mathbf{1010}_n$ can include one or more machines implementing or otherwise associated with one or more cyber assets $\mathbf{1016}_1$, $\mathbf{1016}_2$ . . . $\mathbf{1016}_n$. Each entity $\mathbf{1010}_1$, $\mathbf{1010}_2$, . . . $\mathbf{1010}_n$ can include an intranet (i.e., network) by which each machine can communicate. As mentioned above, each entity $\mathbf{1010}_1$, $\mathbf{1010}_2$, . . . $\mathbf{1010}_n$ can represent a tenant (e.g., customer), such as an organization, contracting with the cyber risk management provider for security services. Accordingly, the cyber risk management provider server 1002 can be configured to have oversight over one or more of the entities $\mathbf{1010}_1$, $\mathbf{1010}_2$, and $\mathbf{1010}_n$ of the plurality, and thus, can responsible for monitoring and/or managing an entity's cyber assets (e.g., 1012, 1014, 1016) in order to mitigate cyber security threats.

Still referring to FIG. 1, the memory 1004 of the cyber risk management provider server 1002 can store cyber asset databases 1040. The cyber asset databases 1040 can include information correlating the various cyber assets 1012, 1014, 1016 with the appropriate entity $\mathbf{1010}_1$, $\mathbf{1010}_2$, and $\mathbf{1010}_n$. The cyber asset databases 1040 may be generated by the footprinting module 1020. However, as previously discussed, identifying the cyber assets (e.g., 1012, 1014, 1016) of a plurality of entities (e.g. $\mathbf{1010}_1$, $\mathbf{1010}_2$, . . . $\mathbf{1010}_n$) by a cyber risk management provider (e.g. using cyber risk management provider server 1002) can be a complex and resource-intensive process. Moreover, misclassifying and omitting cyber assets of a particular entity can be detrimental to the cyber security risk mitigation process. Thus, the disclosure now turns to various methods for identifying the cyber assets of a plurality of entities and generating cyber risk mitigation actions based on the identified assets.

Figure 2:
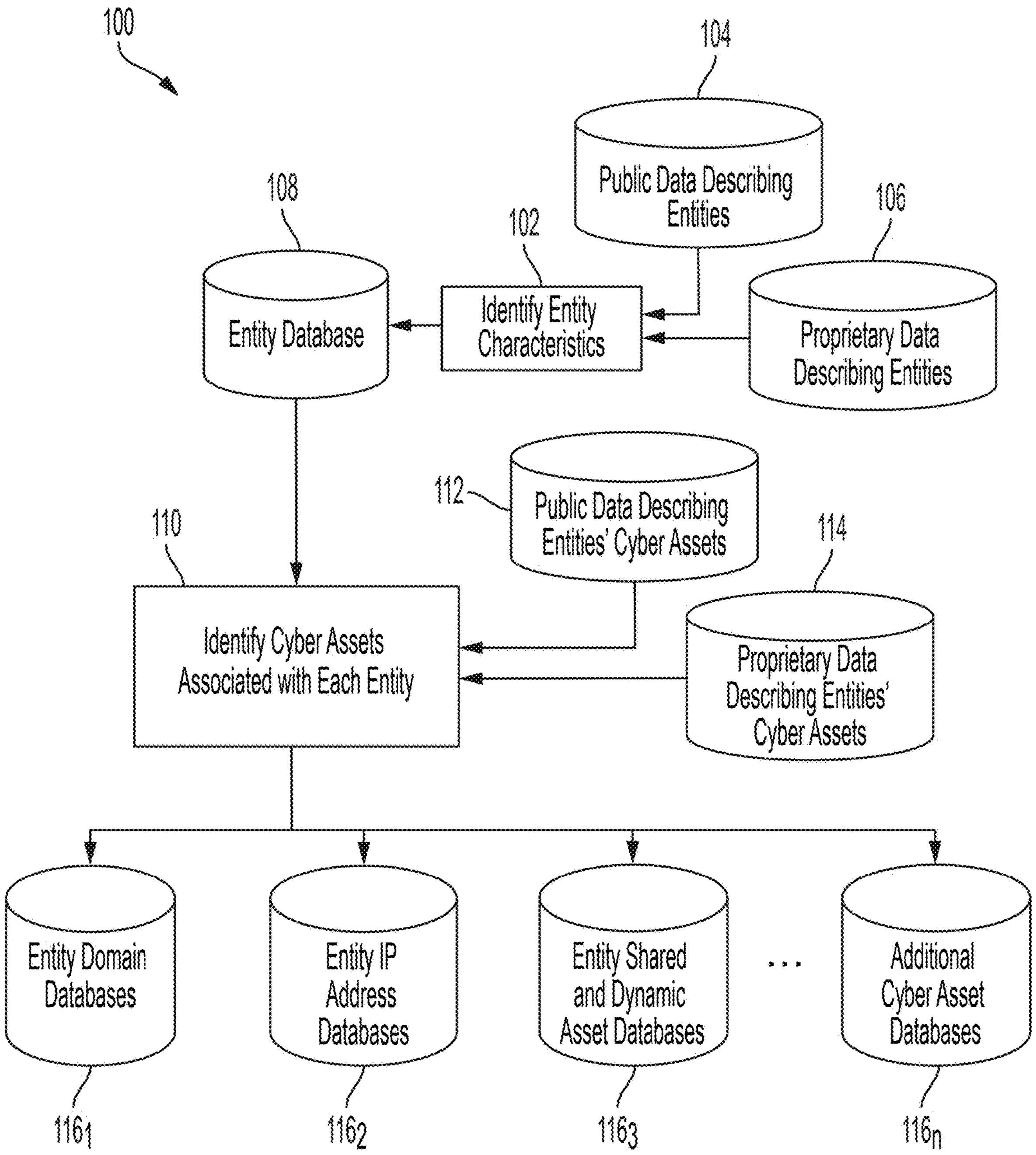
FIG. 2 illustrates a flow chart of a method for identifying cyber assets associated with a plurality of entities, in accordance with at least one non-limiting aspect of the present disclosure.

Referring now to FIG. 2, a flow chart of a method 100 for identifying cyber assets associated with a plurality of entities is illustrated, in accordance with at least one non-limiting aspect of the present disclosure. The method 100 of identifying cyber assets associated with a plurality of entities is sometimes referred to herein as "the footprinting process 100." In various aspects, the cyber risk management provider server 1002 of FIG. 1 can generate a footprinting module 1020 to perform the footprinting process 100. Additionally, in various aspects, any of the steps of footprinting process 100 can be executed using an algorithm that employs machine learning, statistical techniques, and/or logical and expert systems-based techniques, as well as searching, sorting, collation and other data processing techniques and logic.

The footprinting process 100 can proceed by identifying 102 entity-specific characteristics to generate entity database 108. As explained above, it may be difficult to distinguish between entities because of ambiguities related to their identifying characteristics (e.g., entities may do business under the same or similar names). Thus, identifying 102 entity-specific characteristics can comprise executing an algorithm that causes the search and analysis of public data describing entities 104 and/or proprietary data describing entities 106 for identifiers that are specifically unique to a particular entity. Those unique identifiers can be correlated to specific entities to generate an entity database 108. For example, referring again to the "Island Realty" example mentioned above, searching public and/or proprietary data describing entities 104, 106 (e.g., domain registration data) may reveal that the domain "islandrealty.com" is registered to an organization doing business under the name "Island Realty" in South Carolina. Thus, because the domain "islandrealty.com" is unique and may not be shared by other entities, it can be used to reliably distinguish the cyber presence and assets of the "Island Realty" in South Carolina from other entities. This domain can be correlated with Island Realty in South Carolina and added to entity database 108.

The identifiers used to generate the entity database 108 can comprise identifiers such as, for example, Internet domains, street addresses, phone numbers, corporate registration numbers, and tax identifiers. The public data describing entities 104 can comprise databases with information such as, for example, Security and Exchange Commission (SEC) filings, Internal Revenue (IRS) disclosures, state-based corporate and/or charitable registrations with Secretaries of State, legal filings, government filings, Global Legal Entity Identifier Foundation identifiers, Public Key Certificates, information found on organizational websites, public internet registrations, patent filings, and trademark filings. The proprietary data describing entities 106 can comprise databases with information such as, for example, catalogues of firmographic information concerning entities purchased from Dun & Bradstreet, Moody's, Standard & Poor's, Zoominfo, Open Corporates, and mailing list and/or sales lead suppliers. The public data describing entities 104 and proprietary data describing entities 106 can often be incomplete and contain errors. Accordingly, in various aspects, identifying 102 entity-specific characteristics can comprise employing machine learning and/or statistical techniques, searching, sorting, collating, and logic-driven discrimination like expert systems evaluation to disambiguate entities.

The footprinting process 100 can continue by identifying 110 cyber assets associated with the entities in entity database 108. As explained above, a given entity can be associated with several different types of cyber assets, such as, for example, domains, IP addresses, and shared and dynamic assets. However, no prior source or method exists from which cyber assets of multiple entities can be easily identified and classified. Thus, to address this need, identifying 110 cyber assets associated with the entities in entity database 108 can comprise executing an algorithm or algorithms that cause the search and analysis of public data describing entities' cyber assets 112 and/or proprietary data describing entities' cyber assets 114. Based on this search and analysis, the specific types of cyber assets can be identified and correlated with the identifiers stored in entity database 108 to generate entity domain databases $\mathbf{116}_1$, entity IP address databases $\mathbf{116}_2$, entity shared and dynamic asset databases $\mathbf{116}_3$, and/or any number of other cyber asset databases $\mathbf{116}_n$ for storing data related to various types of cyber assets (collectively the "cyber asset databases 116"). In some aspects, cyber asset databases 116 can be similar to the cyber asset databases 1040 referenced with respect to FIG. 1. The process of identifying 110 the cyber assets associated with each entity in the entity database 108 may comprise one or more of the steps of the method 300 for identifying cyber assets based on a democratic algorithm and/or the method 500 for identifying domains based on a democratic matching algorithm to generate cyber risk mitigation actions discussed in detail below with respect to FIGS. 5-10. In various aspects, the algorithm or algorithms used for identifying 110 cyber assets can employ searching, sorting, collating, and/or statistical techniques; logic-driven discrimination such as with an expert system evaluation; and/or machine learning.

In one aspect, the entity domain databases $\mathbf{116}_1$ can comprise a plurality of domain databases, wherein each domain database comprises domains that have been classified as being associated with a particular entity from the entity database 108. In another aspect, the entity IP address databases $\mathbf{116}_2$ can comprise a plurality of IP address databases, wherein each IP address database comprises IP addresses that have been classified as being associated with a particular entity from entity database 108. In another aspect, the entity shared and dynamic asset databases $\mathbf{116}_3$ can comprise a plurality of shared and dynamic asset databases, wherein each shared and dynamic asset database comprises shared and dynamic assets that have been classified as being associated with a particular entity from entity database 108. In yet another aspect, various other types of other cyber asset databases $\mathbf{116}_n$ can each comprise a plurality of type-specific cyber asset databases, wherein each type-specific cyber asset database comprises a specific type of cyber assets that have been classified as being associated with a particular entity from entity database 108. The cyber asset databases 116 can be used as the basis for generating cyber risk mitigation actions, as discussed below with respect to FIG. 3.

Figure 3:
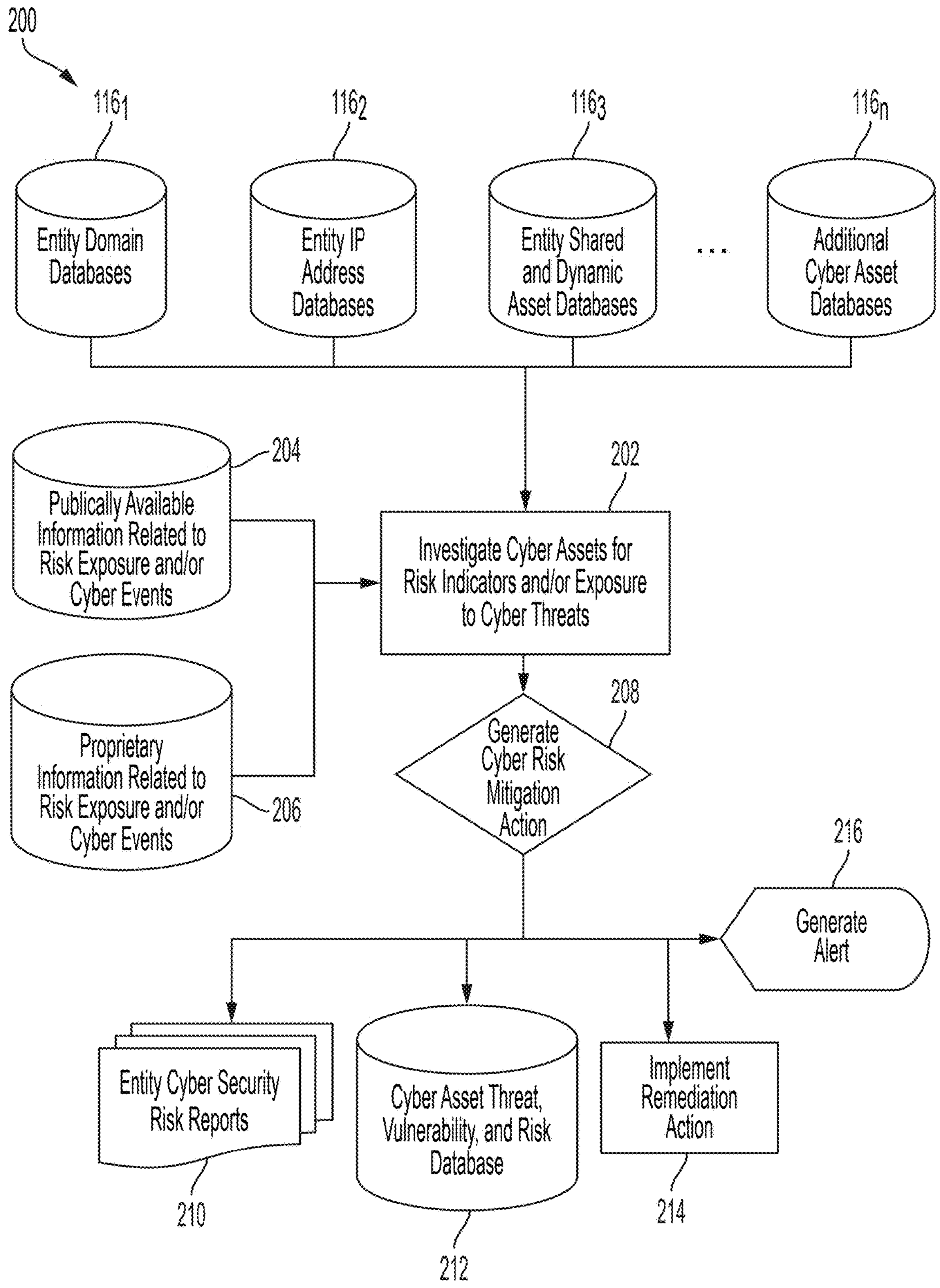
FIG. 3 illustrates a flow chart of a method for generating cyber risk mitigation actions across a plurality of entities based on the cyber assets identified in FIG. 2, in accordance with at least one non-limiting aspect of the present disclosure.

Referring now to FIG. 3, a flow chart of a method 200 for generating cyber risk mitigation actions across a plurality of entities, based on cyber asset databases 116 is illustrated, in accordance with at least one non-limiting aspect of the present disclosure. The method 200 of generating cyber risk mitigation actions across a plurality of entities is sometimes referred to herein as "the cyber risk mitigation process 200." In various aspects, the cyber risk management provider server 1002 of FIG. 1 can generate a risk mitigation module 1030 to perform the cyber risk mitigation process 200. Additionally, in various aspects, any of the steps of the cyber risk mitigation process 200 can be executed using an algorithm that employs searching, sorting, collating, and/or statistical techniques; logic-driven discrimination such as with an expert system evaluation; and/or machine learning.

The cyber risk mitigation process 200 can begin by investigating 202 one or more of the cyber asset databases 116 for cyber assets that are exposed to cyber threats. As explained above, any of the cyber assets (e.g., domains, IP addresses, and shared and dynamic assets) of an entity may be configured such that the entity is exposed to cyber threats. Thus, investigating 202 the cyber asset databases 116 can comprise executing an algorithm or algorithms to determine which of the various cyber assets in cyber asset databases 116 may comprise a configuration that is vulnerable to or being exploited by a cyber threat. In various aspects, investigating 202 the cyber asset databases 116 for cyber threats may comprise one or more of the steps of the method 900 for generating cyber risk mitigation actions based on an entity domain database described in detail below with respect to FIG. 11.

Still referring to FIG. 3, in various aspects, the threat exposure of a given cyber asset configuration may be time-dependent and/or may vary depending on the occurrence of various cyber events. Thus, investigating 202 cyber asset databases 116 for cyber threats can also comprise searching and analyzing the Internet for publicly available information related to the presence of exploitation risk or the occurrence of cyber events 204 and/or searching and analyzing the Internet for proprietary information related to the presence of exploitation risk or the occurrence of cyber events 206 to identify cyber data and events that may indicate one or more of the cyber assets in cyber asset databases 116 is exposed to a cyber threat. In various aspects, the algorithm or algorithms for investigating 202 cyber asset databases 116 for cyber threats can employ various computer-implemented analysis techniques such as, for example, searching, sorting, collating, and/or statistical techniques; logic-driven discrimination such as with an expert system evaluation; and/or machine learning.

The cyber risk mitigation process 200 can continue by generating 208 one or more cyber risk mitigation actions based on the cyber threats and risk indicators identified at 202. Generating 208 a cyber risk mitigation action can comprise, for example, generating entity cyber security risk reports 210, generating a cyber asset threat, vulnerability, and risk database 212, implementing 214 a remediation action, and generating 216 an alert (collectively "cyber risk mitigation actions 210, 212, 214, 216").

In various aspects, generating 208 a cyber risk mitigation action can comprise generating entity cyber security risk reports 210. The entity cyber security risk reports 210 can comprise one or more reports, each report comprising an evaluation of the cyber threat exposure of one or more entities in entity database 108 based on the investigation performed at 202. The risk reports 210 can comprise a risk level score that can be used by the cyber risk management provider to determine the relative risk level of a particular entity compared to other entities in entity database 108.

In various aspects, generating 208 a cyber risk mitigation action can comprise generating an entities' cyber asset threat, vulnerability, and risk database 212. The cyber asset threat, vulnerability, and risk database 212 can comprise a log of each of the assets from cyber asset databases 116 that has been identified as being exposed to a cyber threat, vulnerability, and/or risk at 202. The cyber asset threat, vulnerability, and risk database 212 or portions thereof may be referenced by the cyber risk management provider when making asset management decisions. For example, the cyber asset threat, vulnerability, and risk database 212 can be used to identify cyber assets that need configuration updates.

In various aspects, generating 208 a cyber risk mitigation action can comprise implementing 214 a remediation action. In some aspects, implementing 214 a remediation action can comprise executing an algorithm that causes an automated configuration update to one or more of the cyber assets identified as exposed to a cyber threat at 202. For example, implementing 214 a remediation action can comprise implementing 946 a remediated configuration based on an email-related cyber threat, implementing 962 a remediated configuration based on a host configuration-related cyber threat, and/or implementing 974 a remediated configuration based on a traffic-related cyber threat, as discussed below in reference to FIG. 11.

In various aspects, generating 208 a cyber risk mitigation action can comprise generating 216 an alert in response to identifying one or more cyber assets as being exposed to a cyber threat at 202. For example, in one aspect, an alert may be sent to a security analyst of the cyber risk management provider and/or other parties charged with managing the cyber security of a particular entity. In other aspects, an alert may be sent to a cyber asset or the user of a cyber asset associated with an identified cyber threat. The generated 216 alert can comprise instructions for the security analyst, user, or other party to take a specific action in response to an identified cyber threat. In another aspect, the alert can also take the form of an automated control instruction to computer systems providing security services, for example a control message closing a port could be sent to an entity's firewall upon seeing evidence of malicious activity.

DEMOCRATIC MATCHING ALGORITHM

Having described a general implementation of devices, systems, and methods for identifying entities with an Internet presence, identifying of cyber assets associated with the identified entities, and generating of cyber risk mitigation actions based on the identified cyber assets, the disclosure now turns to the specific implementation of these devices, systems, and methods as they relate to identifying of cyber assets associated with particular entities using a democratic matching algorithm and generating of cyber risk mitigation actions based on the identified cyber assets. Any of the aspects described below with respect to FIGS. 4-11 can be applied to the devices, systems, and methods described above with respect to the system 1000 of FIG. 1, the footprinting process 100 of FIG. 2, and the cyber risk mitigation process 200 of FIG. 3.

Figure 4:
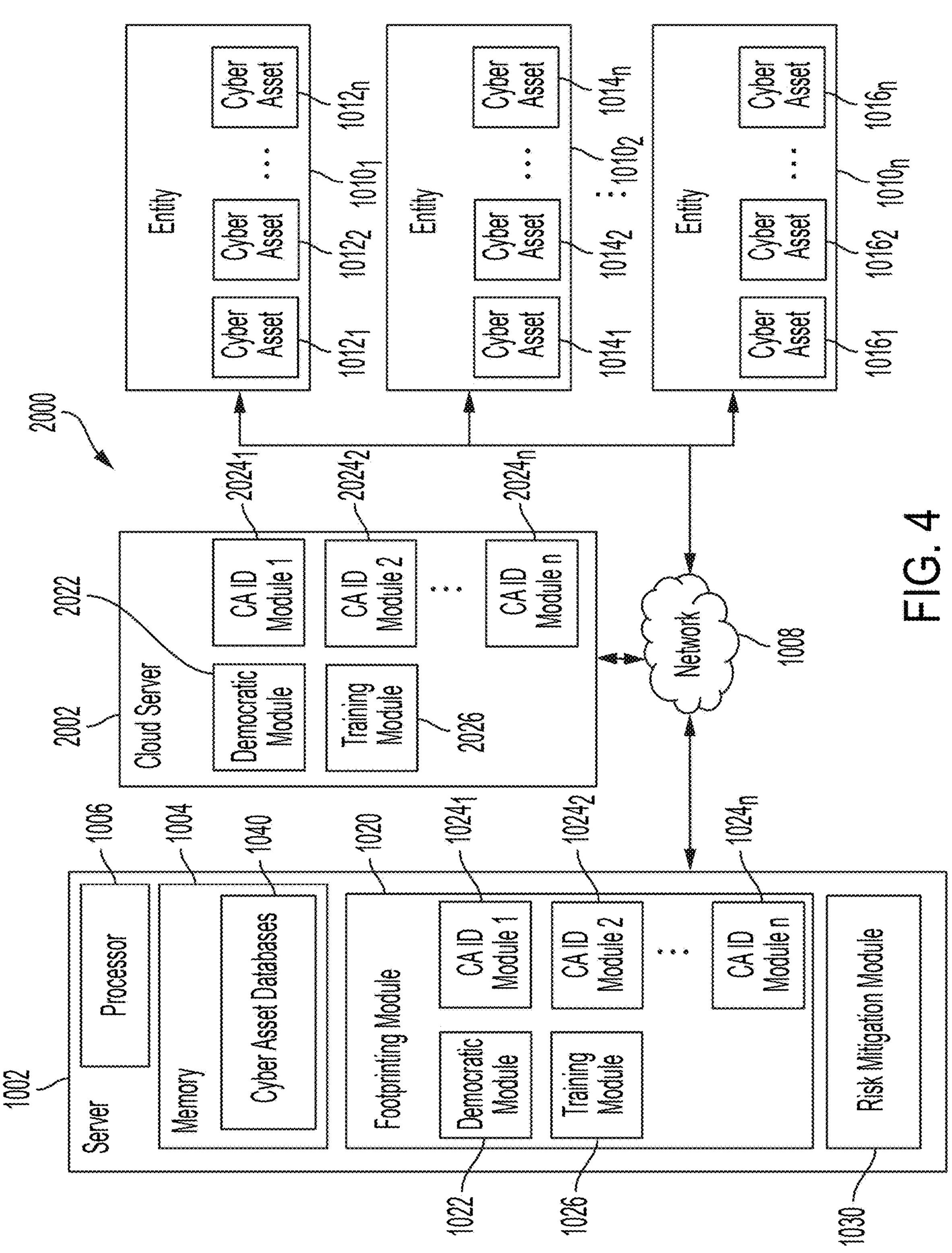
FIG. 4 illustrates a diagram of a system configured for identifying cyber security assets and generating cyber risk mitigation actions for a plurality of entities based on a democratic matching algorithm, in accordance with at least one non-limiting aspect of the present disclosure.
Figure 5:
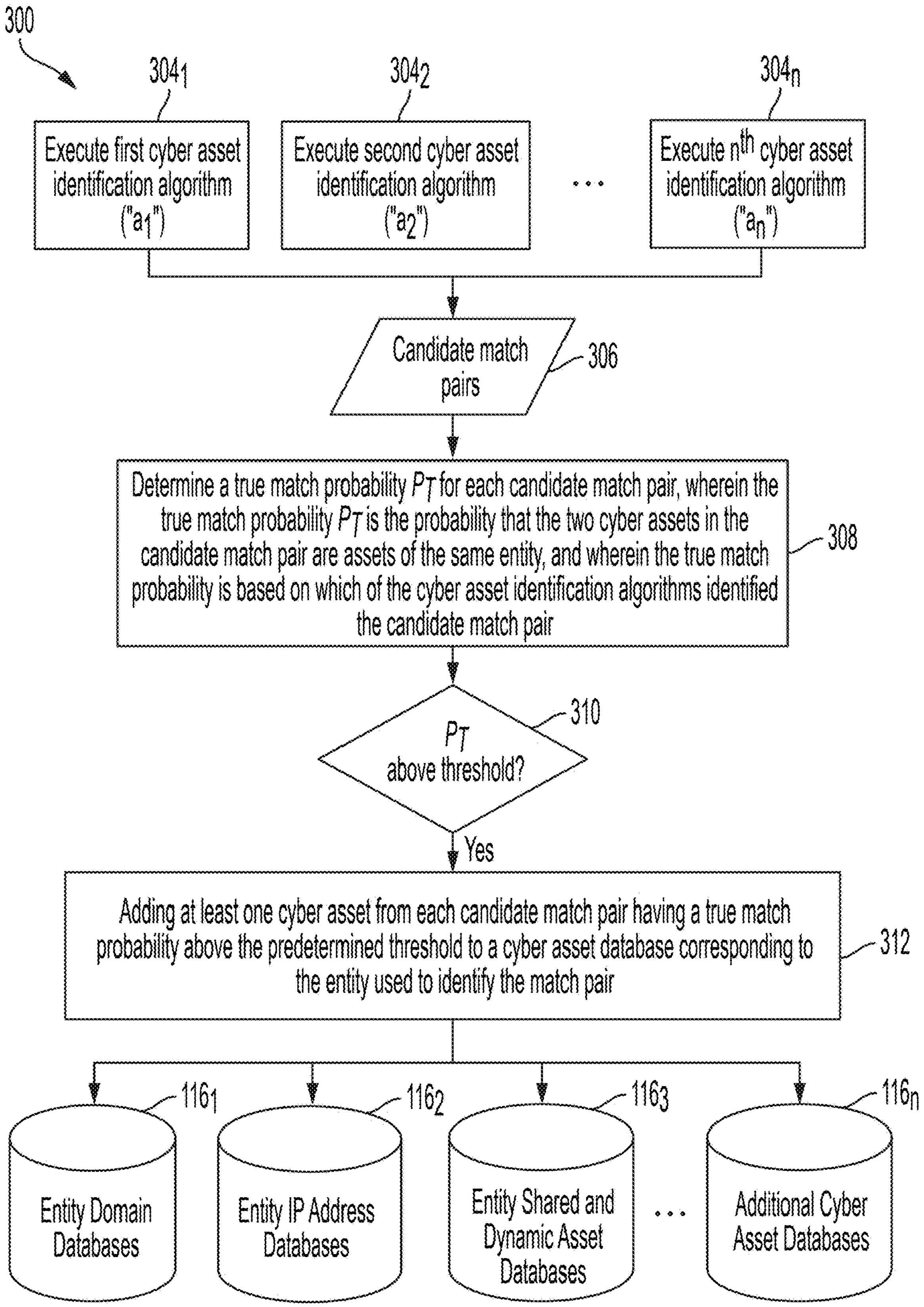
FIG. 5 illustrates a flow chart of a method for identifying cyber assets associated with a plurality of entities based on a democratic matching algorithm, in accordance with at least one non-limiting aspect of the present disclosure.
Figure 7:
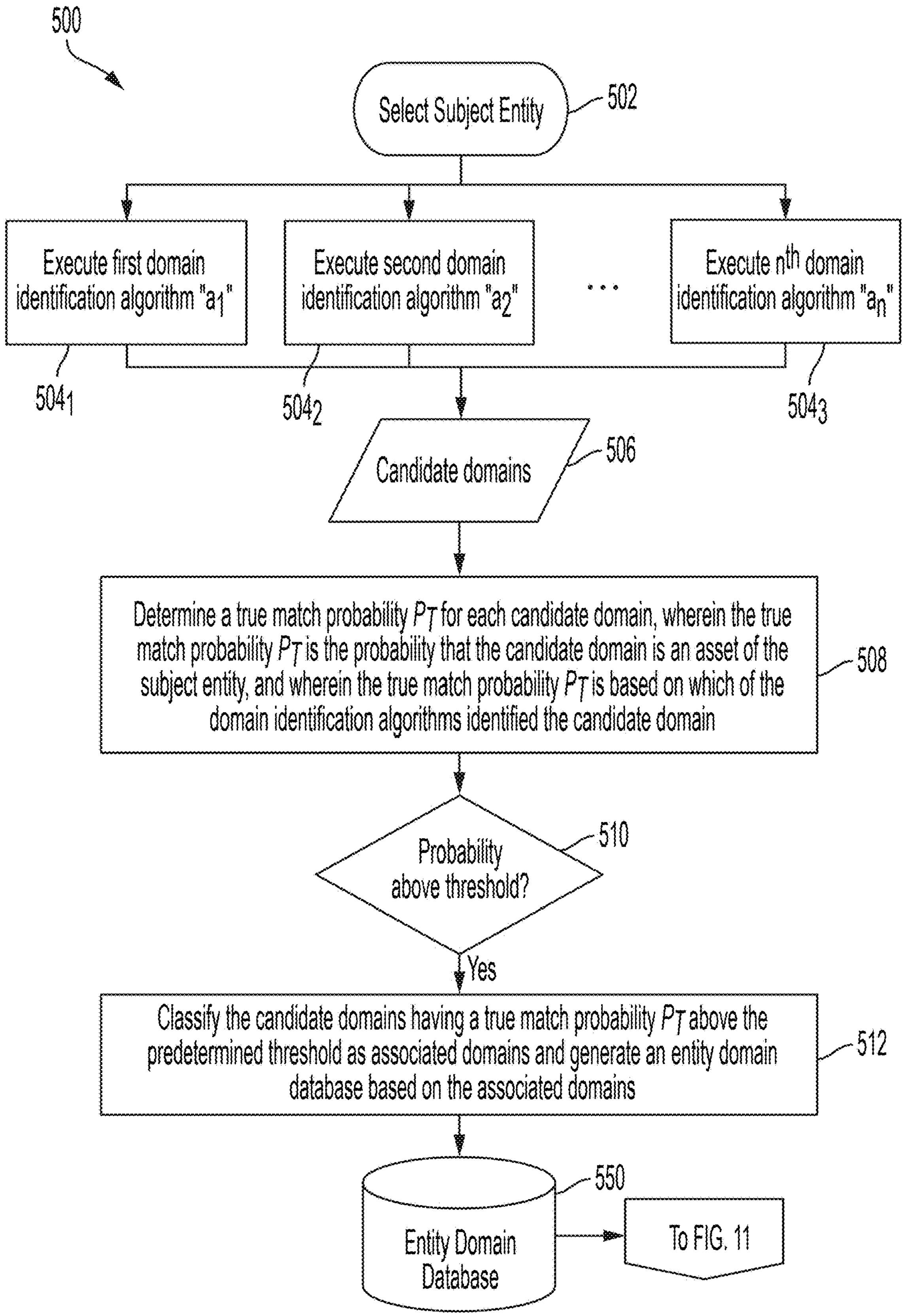
FIG. 7 illustrates a flow chart of a method for identifying domains associated with a subject entity based on a democratic matching algorithm, in accordance with at least one non-limiting aspect of the present disclosure.
Figure 8:
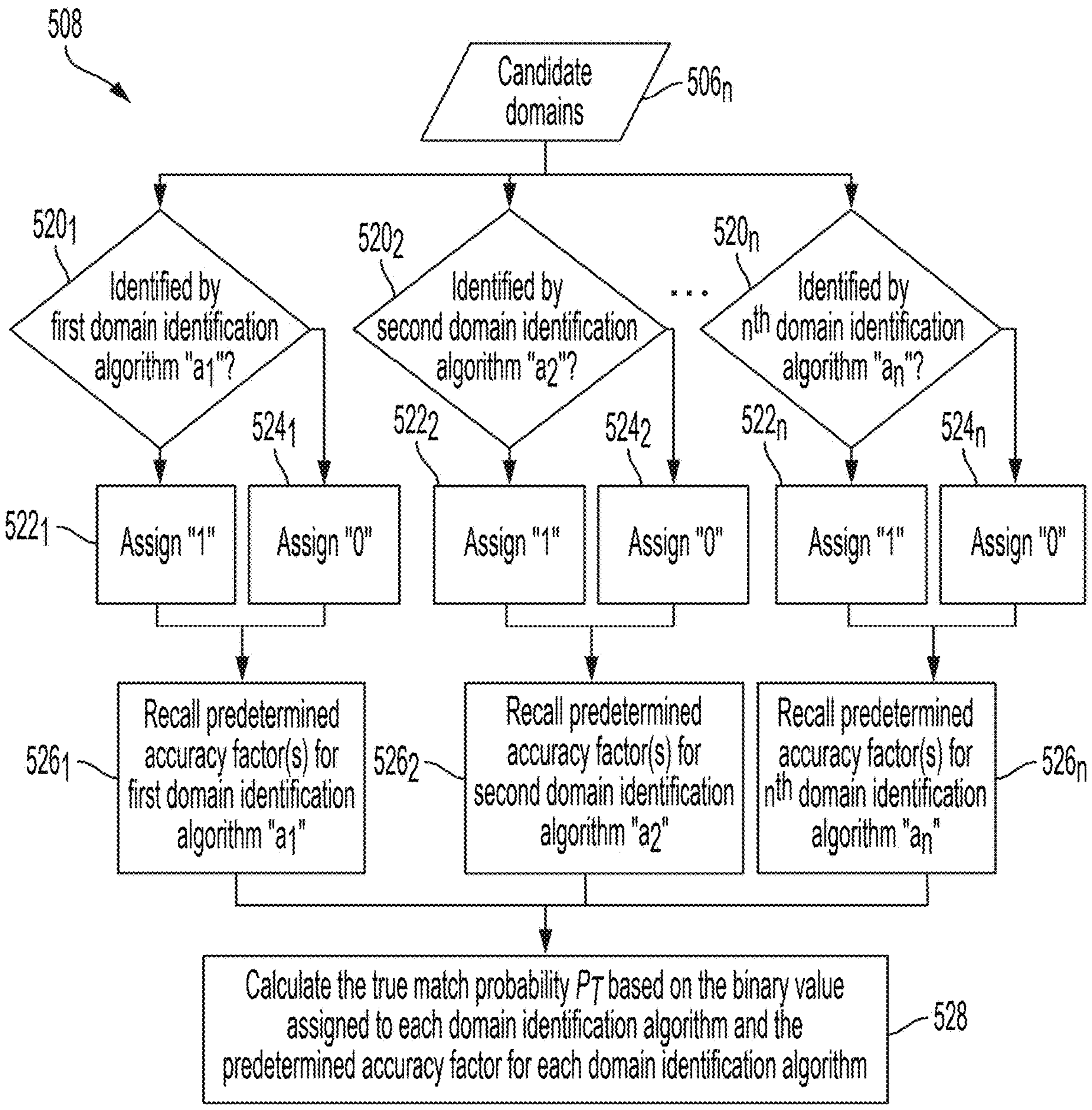
FIG. 8 illustrates a flow chart of a method for determining the probability that a candidate domain is an asset of a subject entity, which may be employed by the method for identifying domains illustrated in FIG. 7, in accordance with at least one non-limiting aspect of the present disclosure.
Figure 10:
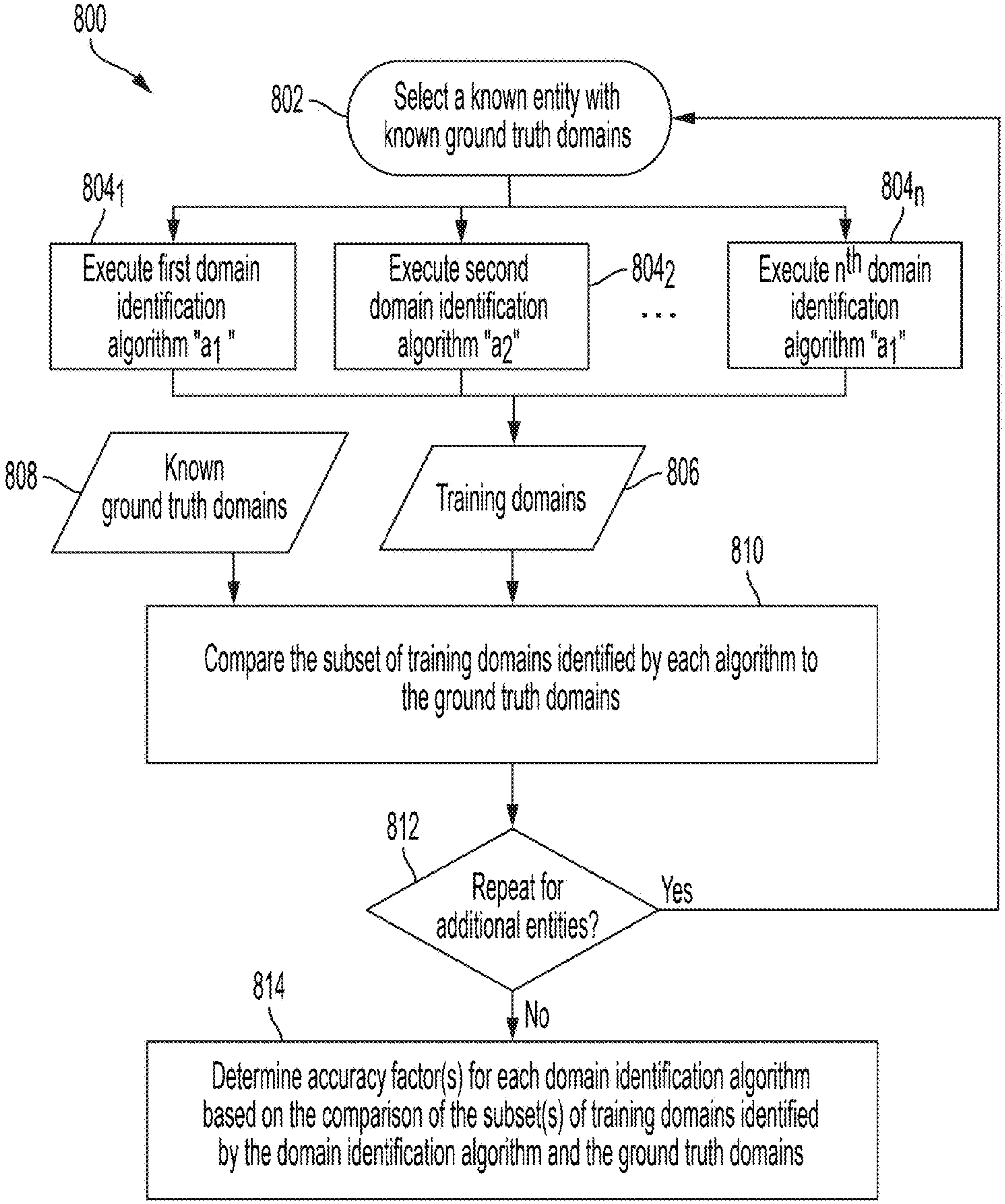
FIG. 10 illustrates a flow chart for determining accuracy factors of domain matching algorithms, in accordance with at least one non-limiting aspect of the present disclosure.

FIG. 5 illustrates a flow chart of a method 300 for identifying cyber assets associated with a plurality of entities based on a democratic matching algorithm and FIG. 6 illustrates an example of a match table 400 that may be employed by the method 300, in accordance with several non-limiting aspects of the present disclosure. As an example of one specific implementation of the method 300, FIGS. 7-8 and 10 illustrate flow charts describing a method 500 for identifying candidate domains 506 associated with a subject entity 502 based on a democratic matching algorithm. Further, FIG. 9 illustrates an example of a match table 700 that may be employed by the method 500. A more detailed appreciation of the various aspects of the method 300 can be gained based on various details disclosed with respect to the method 500 in FIGS. 7-10 and the accompanying description. Accordingly, any aspects disclosed with respect to the method 500 may be brought into the method 300 and vice versa. In various aspects, the cyber risk management provider server 1002 of FIG. 4 can store instructions on memory 1004, executable by the processor 1006, to perform the method 300 and/or the method 500, as described in detail below.

Referring now to FIGS. 5 and 6, the method 300 can begin by executing 304$_1$, 304$_2$, . . . 304$_n$ (collectively "executing 304") a plurality of cyber asset identification algorithms (e.g., $a_1$, $a_2$, . . . $a_n$) to identify a plurality of candidate match pairs 306$_1$, 306$_2$, . . . 306$_n$ (collectively candidate match pairs 306). Each of the candidate match pairs 306 can include two cyber assets (e.g., $CA_i$ and $CA_j$) identified by at least one of the cyber asset identification algorithms as potential assets of the same entity. Although FIGS. 5 and 6 depict the method 300 executing 304 more than two cyber asset identification algorithms, the method 300 can be implemented by executing any number of cyber asset identification algorithms where n is an integer greater than 1.

Referring now primarily to FIG. 6, the results of executing 304 the various cyber asset identification algorithms may be organized in a match table 400. Each candidate match pair 306$_1$, 306$_2$, 306$_3$, 306$_4$, . . . 306$_n$ is organized along a different row of the table 400 and each cyber asset identification algorithm $a_1$, $a_2$, . . . $a_n$ is organized along a different column of the table 400. Along each candidate match pair row, a binary value is assigned to each cyber asset identification algorithm, wherein a "1" is assigned to each cyber asset identification algorithm that identified the candidate match pair 306 and a "0" is assigned to each cyber asset algorithm that failed to identified the candidate match pair 306. For example, referring to match pair 306$_3$, cyber asset identification algorithm $a_1$ identified cyber assets $CA_{520}$ and $CA_{139}$ as potentially belonging to the same entity whereas cyber asset identification algorithms $a_2$ and $a_n$ failed to identify cyber assets $CA_{520}$ and $CA_{139}$ as potentially belonging to the same entity. As another example, referring to match pair 306$_n$, cyber asset identification algorithms $a_1$, $a_2$, and $a_n$ each identified cyber assets $CA_{235}$ and $CA_{166}$ as potentially belonging to the same entity.

The cyber asset identification algorithms $a_1$, $a_2$, . . . $a_n$ can be any type of rule-based matching algorithms configured to search and analyze publically available information and/or proprietary information to identify cyber assets that are potentially owned or otherwise associated with the same entity. Each of the cyber asset identification algorithms may employ a different method (e.g., a different set of rules, a different set of parameters, and/or a different information source or combination of information sources, etc.) to identify candidate match pairs 306.

In some aspects, the cyber asset identification algorithms can be configured to identify candidate match pairs 306 for multiple entities during a single execution of the algorithms, wherein not every identified candidate match pair 306 need be associated with the same entity. For example, referring again to table 400 of FIG. 6, cyber assets $CA_{423}$ and $CA_{74}$ of candidate match pair 306$_1$ may be identified by cyber asset identification algorithms $a_1$ and $a_2$ as potentially belonging to a first entity, with cyber asset identification algorithm $a_3$ failing to identify the match. Further, cyber assets $CA_{389}$ and $CA_{89}$ of candidate match pair 306$_4$ may be identified by cyber asset identification algorithms $a_2$ and $a_n$ as potentially belonging to a second entity, with cyber asset identification algorithm $a_1$ failing to identify the match. Yet further, cyber assets $CA_{235}$ and $CA_{166}$ of candidate match pair 306$_n$ may be identified by cyber asset identification algorithms $a_1$, $a_2$, and an as potentially belonging to a third entity. Thus, in this example, the cyber asset identification algorithms $a_1$, $a_2$, and an are configured to identify candidate match pairs 306 across multiple entities.

In other aspects, the cyber asset identification algorithms can be configured to identify candidate match pairs 306 for a single entity at a time. For example, referring again to table 400 of FIG. 6, each of the candidate match pairs $\mathbf{306}_1$, $\mathbf{306}_2$, $\mathbf{306}_3$, $\mathbf{306}_4$, . . . $\mathbf{306}_n$ may be based on the same entity, with the various algorithms $a_1$, $a_2$, . . . $a_n$ only identifying match pairs for that entity during a single execution of the algorithms. In various aspects, method 500 as described in detail below with respect to FIGS. 7-10, may employ cyber asset identification algorithms configured to identify candidate match pairs 306 (e.g. candidate domains) for a single entity at a time.

Referring again primarily to FIG. 5, and also to FIG. 6, the method 300 can continue by determining 308 a true match probability $P_T$ for each candidate match pair 306. As used herein, a "true match probability" can refer to the overall probability or confidence level that the two cyber assets in a candidate match pair 306 are assets of the same entity based on the collective results of the cyber asset identification algorithms. The true match probability for a particular candidate match pair 306 can depend on which of the cyber asset identification algorithms $a_1$, $a_2$, . . . $a_n$ identified the match pair. For example, referring primarily to FIG. 6, the true match probability $P_T$ for each of the candidate match pairs $\mathbf{306}_1$, $\mathbf{306}_2$, $\mathbf{306}_3$, $\mathbf{306}_4$, . . . $\mathbf{306}_n$ can be calculated based on the binary value assigned to each of the cyber asset identification algorithms $a_1$, $a_2$, . . . $a_n$ for a particular match pair.

The true match probably $P_T$ for each candidate match pair 306 may be calculated or otherwise determined using a variety of different methods. For example, accuracy factor(s) may be assigned to each cyber asset identification algorithm and used to calculate the true match probability $P_T$. The accuracy factor(s) may be predetermined based on training the cyber asset identification algorithms against one or more ground truth set of cyber assets, as explained in more detail below. In some aspects, the accuracy factor(s) for a given cyber asset identification algorithm can include an accuracy factor representing the probability that the algorithm will return a true positive result (i.e., the probability that algorithm will correctly identify a candidate match pair including cyber assets that belong to the same entity) and an accuracy factor representing the probability that the algorithm will return a true negative result (i.e., the probability that algorithm will correctly omit a candidate match pair including cyber assets that do not belong to the same entity). In other aspects, the accuracy factor(s) for a given cyber asset identification algorithm can include another type of weighting factor associated with the algorithm.

As mentioned above, accuracy factor(s) may be predetermined based on training the cyber asset identification algorithms against one or more ground truth set of cyber assets. Specifically, the accuracy factor(s) for each cyber asset identification algorithm may be predetermined based on the accuracy of each algorithm as measured by executing the algorithm to identify training match pairs for an entity having a known ground truth set of cyber assets (i.e., a "known" entity). As used herein, "training match pairs" can refer to match pairs returned by a cyber asset identification algorithm for comparison to a set of ground truth cyber assets. Each training match pair can include two cyber assets identified by at least one of the cyber asset identification algorithms as a potential asset of the known entity. Further, each cyber asset identification algorithm identifies at least a subset of the training match pairs. As used herein, "ground truth cyber assets" can refer to cyber assets known or otherwise confirmed to be associated with a known entity. For example, the ground truth cyber assets for a given entity may be curated or otherwise selected by a security analyst.

Various statistical and/or machine learning techniques can be used to determine accuracy factor(s) for a given cyber asset identification algorithm by comparing the cyber assets in the training match pairs identified by that algorithm to the ground truth set of cyber assets for a known entity. In some aspects, a given cyber asset identification algorithm can be executed multiple times to identify sets of training match pairs for a plurality of known entities. Each set of training match pairs can be compared to the known ground truth set of cyber assets of the corresponding known entity in order to further refine the accuracy factor(s). In other aspects, a support vector machine (SVM) machine learning model can used to determine the accuracy factor(s) for a given cyber asset identification algorithm. Various aspects of the method 800 for determining accuracy factor(s) for domain identification algorithms, as described in below with respect to FIG. 10, may be similarly employed to generally determine accuracy factor(s) for the cyber asset identification algorithms described with respect to method 300 of FIG. 5.

Still referring to FIGS. 5 and 6, in one aspect, Equation 1 below may be used to determine 308 a true match probability $P_T$ for a given candidate match pair 306:

$$P_T = \frac{\prod p_i \prod (1 - r_j)}{\prod p_i \prod (1 - r_j) + \prod (1 - p_i) \prod r_j} \quad \text{Equation 1}$$

In Equation 1 above, $p_i$ is an accuracy factor and represents the probability that a given cyber identification algorithm will return a true positive result. Further, $r_j$ is an accuracy factor and represents the probability that a given cyber identification algorithm will incorrectly return a negative result. Thus, $(1-r_j)$ is the probably that a given cyber identification algorithm will return a true negative result. In some aspects, $p_i$ and $r_j$ are predetermined for each of the cyber asset identification algorithms $a_1$, $a_2$, . . . $a_n$ based on the particular algorithm's accuracy compared to the ground truth, as explained above.

In order to calculate the true match probability $P_T$ for a given candidate match pair 306 using Equation 1 above, the product over i is taken for all cyber asset identification algorithms that identified the candidate match pair 306 (i.e., algorithms assigned a "1" in the corresponding row of the match table 400) and the product over j is taken over all cyber asset identification algorithms that did not identify the candidate match pair 306 (i.e., algorithms assigned a "0" in the corresponding row of the match table 400). In other words, according to the non-limiting aspect of Equation 1 above, the true match probability $P_T$ for a given candidate match pair 306 is equal to the probably that all of the algorithms assigned a "1" and all of the algorithms assigned a "0" are correct, divided by the probably that all of the algorithms assigned a "1" and all of the algorithms assigned a "0" are correct plus the probably that all of the algorithms assigned a "1" and all of the algorithms assigned a "0" are incorrect. As mentioned above, in other aspects, other methods may be used to calculate the true match probability $P_T$ for a given candidate match pair 306. For example, different or additional accuracy factors may be introduced into Equation 1 above (e.g., different or additional weighting and/or probability factors determined based on a model trained using a given ground truth).

Referring again primarily to FIG. 5, and also to FIG. 6, the method 300 can continue by determining 310 whether or not the true match probability $P_T$ for each candidate match pair 306 is above a predetermined threshold. In some aspects, the predetermine threshold may be selected by a security analyst or other user tasked with performing the footprinting process. In other aspects, the predetermined threshold may be automatically determined based on machine learning and/or statistical methods based on trained models using a given ground truth. In yet other aspects, the predetermined threshold may be no less than 0.50, such as, for example, no less than 0.60, 0.70, 0.75, 0.80, 0.85, 0.90, 0.91, 0.92, 0.93, 0.94, 0.95, 0.96, 0.97, 0.98, 0.99, 0.995, 0.996, 0.997, 0.998, or no less than 0.999.

The method can continue by adding 312 at least one cyber asset from each candidate match pair 306 having a true match probability $P_T$ above the predetermined threshold to a cyber asset database 116 corresponding to the entity used to identify the match pair. For example, referring primarily to FIG. 6, and also to FIG. 5, match table 400 shows that a true match probability $P_T$ of 0.91 was determined 308 for candidate match pair $\mathbf{306}_1$. Cyber assets $CA_{423}$ and $CA_{74}$ of candidate match pair $\mathbf{306}_1$ may be IP addresses identified by cyber asset identification algorithms $a_1$ and $a_2$ as potentially both belonging to a first entity. If the true match probability $P_T$ predetermined threshold was selected to be 0.90, then the method 300 would determine 310 that candidate match pair $\mathbf{306}_1$ has a true match probability $P_T$ above the predetermined threshold and add 312 at least one of the cyber assets $CA_{423}$ and $CA_{74}$ to the entity IP address database $\mathbf{116}_2$ corresponding to the first entity.

As another example, table 400 shows that a true match probability $P_T$ of 0.23 was determined 308 for candidate match pair $\mathbf{306}_2$. Cyber assets $CA_{893}$ and $CA_{982}$ of candidate match pair $\mathbf{306}_2$ may be IP addresses identified by cyber asset identification algorithm $a_n$ as potentially both belonging to a second entity. Assuming again that the true match probability $P_T$ predetermined threshold was selected to be 0.90, then the method 300 would determine 310 that candidate match pair $\mathbf{306}_2$ does not have a true match probability $P_T$ above the predetermined threshold. Accordingly, no action would be taken to add either of the cyber assets $CA_{893}$ and $CA_{982}$ to the entity IP address database $\mathbf{116}_2$ corresponding to the second entity. It should be noted that, in some aspects, one of cyber assets $CA_{893}$ and $CA_{982}$ may already be in the entity IP address database $\mathbf{116}_2$ corresponding to the second entity based on a different candidate match pair 306 or a previous operation of the footprinting process.

Having described a general implementation the devices, systems, and methods for identifying cyber assets belonging to entities using a democratic matching algorithm, the disclosure now turns to a specific implementation of these devices, systems, and methods as they relate to identifying domains belonging to a specific entity using a democratic matching algorithm and generating of cyber risk mitigation actions based on the identified domains. As mentioned above, any aspects disclosed below with respect to the method 500 may be brought into the method 300 and vice versa.

Figure 11:
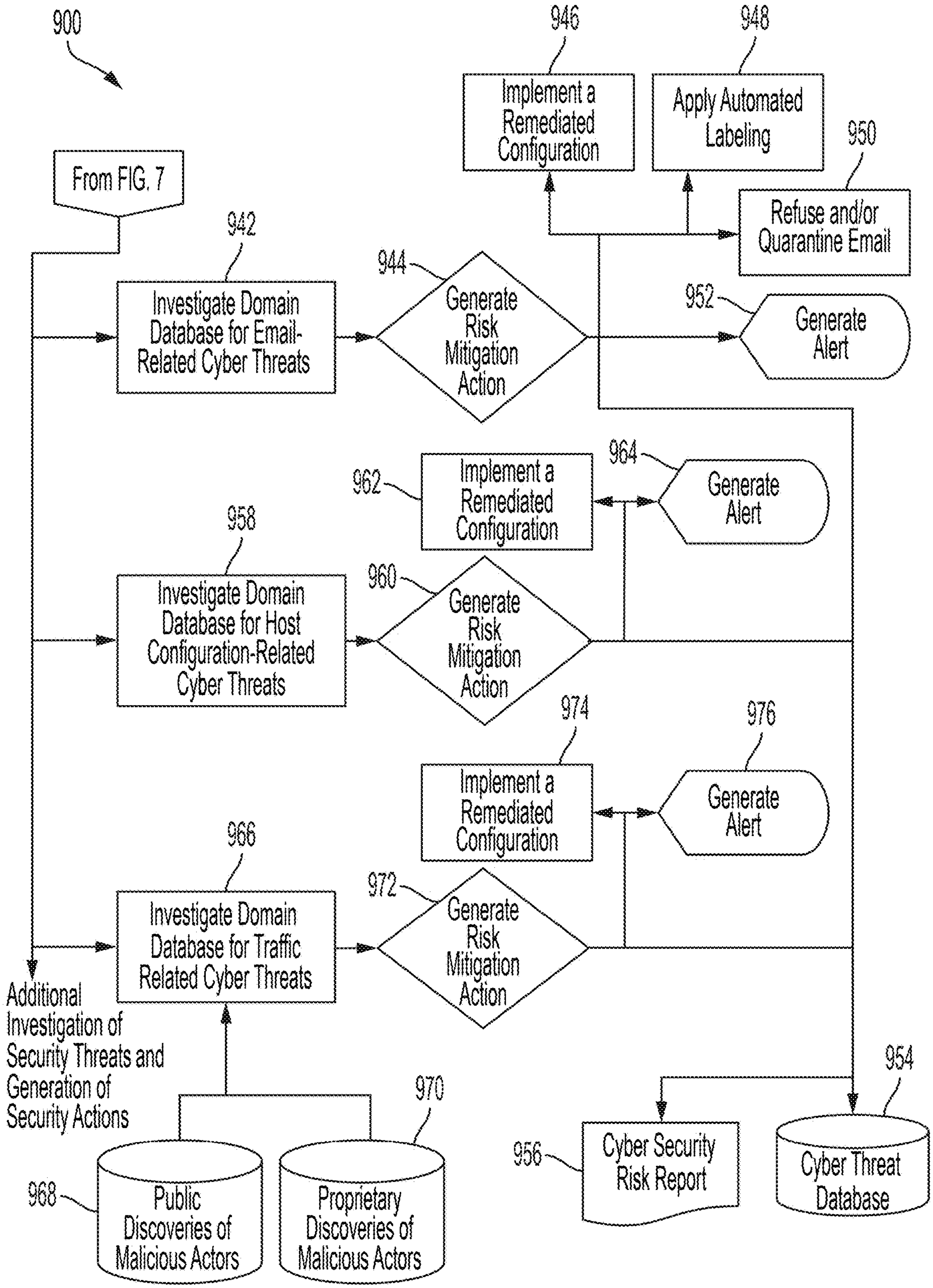
FIG. 11 illustrates a flow chart of a method for generating cyber risk mitigation actions based on an entity domain database, in accordance with at least one non-limiting aspect of the present disclosure.

FIGS. 7-8 and 10 illustrate a flow chart of a method 500 for identifying domains associated with a subject entity 502 based on a democratic matching algorithm and FIG. 11 illustrates a method 900 for implementing cyber risk mitigation actions based on the associated domains, in accordance with several non-limiting aspects of the present disclosure. Further, FIG. 9 illustrates an example of a match table 700 that may be employed by the method 500.

Referring now to FIGS. 7 and 9, the method 500 can begin by selecting a subject entity 502 for evaluation. The method can continue by executing $\mathbf{504}_1$, $\mathbf{504}_2$, . . . $\mathbf{504}_n$(collectively "executing 504") a plurality of domain identification algorithms (e.g., $a_1$, $a_2$, . . . $a_n$) to identify a plurality of candidate domain $\mathbf{506}_1$, $\mathbf{506}_2$, . . . $\mathbf{506}_n$ (collectively candidate domains 506). Each candidate domain 506 is identified by at least one of the domain identification algorithms as a potential asset of the subject entity. Although FIGS. 7 and 9 depict the method 500 executing 504 more than two domain identification algorithms, the method 500 can be implemented by executing any number of domain identification algorithms where n is an integer greater than 1.

The domain identification algorithms $a_1$, $a_2$, . . . $a_n$ can be any type of rule-based matching algorithms configured to search and analyze publically available information and/or proprietary information to identify domains that are potentially owned or otherwise associated with the same entity. The domain identification algorithms $a_1$, $a_2$, . . . $a_n$ can identify candidate domains 506 by identifying domain match pairs 702 where one of the domains in the match pair is always a seed domain ($d_{seed}$) of the subject entity (with the other domain in the match pair 702 being a candidate domain 506). As used herein, a "seed domain" can refer to the primary registered second level domain of the subject entity. For example, a seed domain may be a domain where the subject entity's home page is served from (e.g., bluevoyant.com, amazon.com, uspto.gov, etc.). In some aspects, a seed domain of a subject entity can be a domain that is identified as a unique identifier at 102 of FIG. 1 and stored in entity database 108. Thus, the domain identification algorithms $a_1$, $a_2$, . . . $a_n$ can be configured to identify candidate domains 506 by searching and analyzing publically available information and/or proprietary information to identify domains that are potentially owned or otherwise associated with the same entity as the seed domain $d_{seed}$.

Each of the domain identification algorithms may employ a different method (e.g., a different set of rules, a different set of parameters, a different information source or combination of information sources, etc.). In some aspects, one or more of the domain identification algorithms may be configured to search and analyze Internet registration databases (e.g., a public database with domain registration data such as a DNS database, a proprietary database with domain registration data such as the WhoisXML API domain database) for domains registered to a particular entity. For example, different algorithms may search and analyze different databases. As another example, a single algorithm may search and analyze multiple databases.

In various aspects, one or more of the domain identification algorithms may be configured to apply a filter to exclude some of the identified domains having at least some of the same registration information as the seed domain from being identified as candidate domains 506. For example, domain registration information included in domain registration databases can often include field values such as "REDACTED." Thus may result in a large number of identified matches with the seed domain. In some aspects, the applied filter may be configured to eliminate matches based on registration fields including "REDACTED" or similar values. In other aspects, the applied filter may be configured to limit the number of candidate domains 506 that me be identified. For example, a domain identification algorithm may be limited to identifying no more than 100,000 candidate domains 506, such as no more than 10,000, 9,000, 9,000, 7,000, 6,000, 5,000, 4,000, 3,000, 2,000, 1,000, 900, 800, 700, 600, 500, 400, 300, 200, or no more than 100 candidate domains 506.

In various aspects, one or more of the domain identification algorithms $a_1$, $a_2$, . . . $a_n$ may be configured to employ one or more of the various redirection techniques described in the aforementioned International Patent Application No. PCT/US2023/062894, titled DEVICES, SYSTEMS, AND METHODS FOR IDENTIFYING CYBER ASSETS AND GENERATING CYBER RISK MITIGATION ACTION BASED ON DOMAIN REDIRECTS, filed on Feb. 20, 2023, which is herein incorporated by reference in its entirety.

Referring now primarily to FIG. 9, the results of executing 504 the various domain identification algorithms may be organized in a match table 700. Each candidate match pair 702 includes a seed domain of the subject entity ($d_{seed}$) and a candidate domain 506. Each candidate domain (or each match pair 708 including a different candidate domain) 506$_1$, 506$_2$, 506$_3$, 506$_4$, . . . 506$_n$ is organized along a different row of the match table 700 and each domain identification algorithm $a_1$, $a_2$, . . . $a_n$ is organized along a different column of the match table 700.

Referring again primarily to FIG. 7, the method 500 can continue by determining 508 a true match probability $P_T$ for each candidate domain 506. Each true match probability $P_T$ is the probability that the corresponding candidate domain 506 is a cyber asset of the subject entity. The true match probability $P_T$ for a particular candidate domain 506 can depend on which of the domain identification algorithms $a_1$, $a_2$, . . . $a_n$ identified the domain. For example, FIG. 8 illustrates a flow chart of a method for determining 508 the true match probability $P_T$ for a candidate domain 506$_n$, in accordance with at least one non-limiting aspect of the present disclosure.

Referring now to FIGS. 8 and 9, determining 508 the true match probability $P_T$ for a candidate domain 506$_n$ can include determining 520$_1$, 520$_2$, . . . 502$_n$ (collectively determining 520) whether or not each of the domain identification algorithms $a_1$, $a_2$, . . . $a_n$ identified the candidate domain 506$_n$. A binary value can be assigned to each domain identification algorithm based the determination 520 with a "1" being assigned 522$_1$, 522$_2$, . . . 522$_n$ to each domain identification algorithm that identified the candidate domain 506$_n$ and a "0" being assigned 524$_1$, 524$_2$, . . . 524$_n$ to each domain identification algorithm that did not identify the candidate domain 506$_n$. The results of each assignment 522, 524 may be organized in the match table 700. For example, along the row corresponding to candidate domain 506$_n$, a "1" has been assigned 522 domain identification algorithms $a_1$, $a_2$, and an meaning that each of these algorithms identified the candidate domain 506$_n$ as a result of their execution 504. As another example, along the row corresponding to candidate domain 506$_2$, a "0" has been assigned 524 to domain identification algorithms $a_1$ and $a_2$ because it was determined 520 that these algorithms did not identify the candidate domain 506$_2$.

Still referring to FIGS. 8 and 9, determining 508 the true match probability $P_T$ for a candidate domain 506$_n$ can further include recalling 526$_1$, 526$_2$, . . . 526$_n$ predetermined accuracy factor(s) for each of the domain identification algorithms $a_1$, $a_2$, . . . $a_n$. As mentioned above, the accuracy factor(s) for a given cyber asset identification (e.g., domain identification) algorithm can include an accuracy factor representing the probability that the algorithm will return a true positive result (i.e., the probability that algorithm will correctly identify a candidate domain belonging to the subject entity) and/or an accuracy factor representing the probability that the algorithm will return a true negative result (i.e., the probability that algorithm will correctly omit domains that do not belong to the subject entity). In other aspects, the accuracy factor(s) for a given cyber asset identification (e.g., domain identification) algorithm can include another type of weighting factor for the algorithm. The accuracy factor(s) may be predetermined based on training the cyber asset identification algorithms (e.g., domain identification algorithms) against one or more ground truth set of cyber assets (e.g., ground truth domains). Various machine learning and/or statistic methods may be used to determine the accuracy factor(s) for each algorithm. An example method 800 for determining accuracy factor(s) for domain identification algorithms is described below with respect to FIG. 10.

Still referring to FIGS. 8 and 9, determining 508 the true match probability $P_T$ for a candidate domain 506$_n$ can further include calculating 528 the true match probability based on the binary value assigned to each domain identification algorithm and the accuracy factor for each domain identification algorithm. As explained above, the true match probably $P_T$ may be calculated or otherwise determined using a variety of different methods. For example, Equation 1 described above may be used calculate the true match probably $P_T$ for the candidate domain 506$_n$. As another example, different or additional accuracy factors for the domain identification algorithms may be introduced into Equation 1 to calculate the true match probably $P_T$ for the candidate domain 506$_n$ (e.g., different or additional weighting and/or probability factors determined based on a model trained using a given ground truth).

Referring again primarily to FIG. 7, and also to FIG. 9, after the true match probability $P_T$ for each candidate domain 506 is determined, the method 500 can continue by determining 510 whether or not the true match probability $P_T$ for each candidate domain 506 is above a predetermined threshold. In some aspects, the predetermine threshold may be chosen by a security analyst or other user tasked with performing the footprinting process. In other aspects, the predetermined threshold may be automatically determined based on machine learning and/or statistical methods by comparing trained models to a given ground truth. In yet other aspects, the predetermined threshold may be no less than 0.70, such as, for example, no less than 0.75, 0.80, 0.85, 0.90, 0.91, 0.92, 0.93, 0.94, 0.95, 0.96, 0.97, 0.98, 0.99, 0.995, 0.996, 0.997, 0.998, or no less than 0.999.

The method can continue by classifying 512 each candidate domain 506 having a true match probability $P_T$ above the predetermined threshold as an associated domain. As used herein, an "associated domain" can refer to a domain that is considered to be an asset of the subject entity. For example, referring primarily to FIG. 9, and also to FIG. 7, if a true match probability threshold of 0.90 is applied at 510, candidate domains 506$_1$ ($d_1$) and 506$_n$ ($d_n$) would be classified 512 as associated domains because candidate domains 506$_1$ ($d_1$) and 506$_n$ have a true match probability $P_T$ greater than 0.90. In some aspects, the method 500 can also include generating an entity domain database 550 for the subject entity based on the associated domains. The entity domain database 550 may be one of the entity domain databases 116$_1$ described above with respect to FIG. 3. Various cyber risk mitigation actions may be generated based on the entity domain database 550, as explain in detail below with respect to FIG. 11.

Referring now to FIG. 10, a flow chart of a method 800 for determining accuracy factor(s) for domain matching algorithms $a_1$, $a_2$, . . . $a_n$ is illustrated, in accordance with at least one non-limiting aspect of the present disclosure. In one aspect, the accuracy factors determined by method 800 may be the predetermined accuracy factor(s) recalled 526 to determine 508 a true match probability $P_T$ for each candidate domain 506 as part of method 500, as explained with reference to FIGS. 7 and 8 above.

The method 800 begins by selecting 802 a known entity with known ground truth domains. As used herein, "ground truth domains" can refer to domains known or otherwise confirmed to cyber assets of the selected 802 known entity. For example, the ground truth domains for a given entity may be curated or otherwise selected by a security analyst. In some aspects, the method 800 can include identifying the ground truth domains of the selected 802 known entity.

The method 800 can continue by executing 804$_1$, 804$_2$, . . . 804$_n$ (collectively executing 804) each of the domain matching algorithms $a_1, a_2, \ldots a_n$ to identify a plurality of training domains 806. The executed 804 algorithms $a_1, a_2, \ldots a_n$ can be the same algorithms used to identify candidate domains 506 as describe with respect to FIG. 7. Further, similar to the candidate domains 506, each training domain 806 is identified by at least one of the domain identification algorithms $a_1, a_2, \ldots a_n$ as a potential asset of the known entity, with each domain identification algorithm identifying a subset of the training domains 806.

The method 800 can continue by comparing the subset of training domains 806 identified by each domain identification algorithm $a_1, a_2, \ldots a_n$ to the known ground truth domains 808 of the know entity. The know ground truth domains 808 may be a complete or nearly complete set of all of the domains owned by the know entity. Thus, by comparing the subset of training domains 806 identified by a particular domain identification algorithm the accuracy of the algorithm can be determined. For example, the accuracy of a particular domain identification algorithm may be based on the ground truth domains that the algorithm failed to identify as part of the training domains 806. Additionally, the accuracy of a particular domain identification algorithm may be based the extra training domains 806 identified by the algorithm that are not part of the ground truth domains 808.

In some aspects, the method 800 can continue by repeating the process of selecting 802 a different known entity, executing 804 the domain identification algorithms for that entity, and comparing 810 the subsets of training domains 806 identified by each algorithm to the known ground truth domains 808 for that entity. By repeating this process for multiple entities, a more refined accuracy for each domain identification algorithm may be determined.

The method 800 can continue by determining 814 accuracy factor(s) for each domain identification algorithm based on the comparison 810 of the subset(s) of training domains 806 identified by the domain identification algorithm with the ground truth domains 808. Various statistical and/or machine learning techniques can be used to determine 814 accuracy factor(s) for a given domain identification algorithm. For example, the training domain 806 and domain identification algorithms may be organized in a table similar to the match table 700 discussed above with respect to FIG. 9 to generate a binary categorical feature vector. In some aspects, this binary categorical feature vector can be used to determine the probabilities related to the performance of each algorithm (e.g., using a naïve regression model, a logistic regression model, etc.). In some aspects, a machine learning technique, such as a support vector machine (SVM) model, can be used to determine accuracy factor(s) for each domain identification algorithm.

Referring now to FIG. 4, a diagram of a system 2000 configured for identifying cyber assets and generating cyber risk mitigation actions across multiple entities based on a democratic matching algorithm is illustrated, in accordance with at least one non-limiting aspect of the present disclosure. The system 2000 can be similar in many respects to the system 1000 described above with respect to FIG. 1 (with corresponding reference characters representing corresponding components). For example, the system 2000 can include a cyber risk management provider server 1002 comprising a memory 1004 and a processor 1006 to generate a footprinting module 1020. The footprinting module 1020 can include one or more cyber asset identification (CA ID) modules 1024$_1$, 1024$_2$, . . . 1024$_n$(collectively "cyber asset identification modules 1024"); a democratic matching algorithm module 1022 (democratic module 1022); and/or a training module 1026.

The system 2000 can further include a cloud server 2002 communicably coupled to the cyber risk management provider server 1002 and the various entities 1010$_1$, 1010$_2$, . . . 1010$_n$ via network 1008. Similar to the footprinting module 1020, the cloud server 2002 can include one or more cyber asset identification (CA ID) modules 2024$_1$, 2024$_2$, . . . 2024$_n$ (collectively "cyber asset identification modules 2024"); a democratic matching algorithm module 2022 (democratic module 2022); and/or a training module 2026.

The various cyber asset identification (CA ID) modules 1024, 2024 may be used to execute 304, 504 the various cyber asset identification algorithms $a_1, a_2, \ldots a_n$ (e.g. domain identification algorithms $d_1, d_2, \ldots d_n$) described above with respect to FIGS. 5-10. In some aspects, each cyber asset identification module 1024, 2024 may execute a different cyber asset identification algorithm.

The democratic matching algorithm modules 1022, 2022 may be used to execute various steps of the democratic matching algorithms (e.g., determining 308, 508 a true match probability $P_T$ of candidate match pairs/candidate domains, determining 310, 510 if the true match probability $P_T$ is above a predetermined threshold, adding 312 cyber assets to cyber asset databases 116, classifying 512 candidate domains as associated domains, etc.) described above with respect to FIGS. 5-10.

The training modules 1026, 2026 may be used to execute various steps of the method 800 to determine accuracy factor(s) for each of the cyber asset identification algorithms (e.g., domain identification algorithms), as described above with respect to FIGS. 5 and 10.

In various aspects, the cyber asset identification modules 1024, democratic matching algorithm module 1022, and training module 1026 may be implemented via on-premises-based software instances configured to execute the modules' respective functions. In various other aspects, the cyber asset identification modules 2024, democratic module 2022; and training module 2026 may be implemented via cloud-based software instances configured to execute the modules' respective functions. Any combination of on-premises- and cloud-based modules 1022, 1024, 1026, 2022, 2024, 2026 may be used to carry out the methods 300, 500, and 800 described below.

As mentioned above, various cyber risk mitigation actions may be generated based on the results of the democratic matching algorithm described in method 500 of FIG. 7. For example, FIG. 11 illustrates a flow chart of a method 900 for generating cyber risk mitigation actions based on the entity domain database 550 generated by method 500, in accordance with at least one non-limiting aspect of the present disclosure.

Referring to FIG. 11, the method 900 can include investigating the domains included in entity domain database 550 for cyber security threats, such as, for example, investigating 942 for email-related cyber threats, investigating 958 for host configuration-related cyber threats, investigating 966 for traffic-related cyber threats, or investigating for additional types of cyber threats.

In some aspects, the entity domain database 550 can comprise domains that are associated with email configurations of the subject entity 502. For example, entities often associate email addresses with a well-known domain (e.g., the email address "billg@microsoft.com" and the domain "microsoft.com"). Thus, the entity domain database 550 can be investigated 924 for email-related security threats. An email-security related threat can comprise, for example, the use of an email configuration lacking an email authentication method or an email configuration with a misconfigured authentication method. Various methods of domain-based email authentication exist, such as, Sender Policy Framework (SPF), DomainKeys Identified Mail (DKIM), and other similar sender domain-based methods of allowing email recipients to validate email (e.g. DMARC, BIMI, etc.). See Kitterman, S., *Sender Policy Framework* (*SPF*) *for Authorizing Use of Domains in Email, Version* 1, RFC 7208, DOI 10.17487/RFC7208 (April 2014) https://www.rfc-editor.org/info/rfc7208; Crocker, D., Ed., Hansen, T., Ed., and M. Kucherawy, Ed., *DomainKeys Identified Mail* (*DKIM*) *Signatures*, STD 76, RFC 6376, DOI 10.17487/RFC6376, (September 2011) https://www.rfc-editor.org/info/rfc6376; and Rose et al., *Trustworthy Email*, NIST Special Publication 800-177 Rev. 1, (February 2019), https://nvlpubs.nist.gov/nistpubs/SpecialPublications/NIST.SP.800-177r1.pdf, each of which are incorporated by reference herein in their entirety. Thus, in some aspects, investigating 942 for email-related cyber risks may comprise analyzing the domains in entity domain database 550 for the use of an email authentication method. However, email authentication can be misconfigured such that the authentication method is insecure. Therefore, in other aspects, investigating 942 for email-related cyber threats can comprise analyzing the domains in entity domain database 550 for the use of a misconfigured email authentication method. In other aspects, various other email security controls may be investigated 942. For example, investigating 942 for email-related cyber threats may include assessing an entity's usage of SPAM filters, malware detection, phishing protections, etc.

Still referring to FIG. 11, the method 900 can continue by generating 944 one or more cyber risk mitigation actions based on the identified email-related cyber threats. Generating 944 one or more cyber risk mitigation actions can comprise, for example, automatically implementing 946 a remediated email authentication configuration, applying 948 automated labeling indicating that an email may not be authentic, automatically refusing and/or quarantining 950 an email that may be exposed to a cyber threat, generating 952 an alert, generating a cyber threat database 954, and/or generating a cyber security risk report 956.

In various aspects, generating 944 one or more cyber risk mitigation actions can comprise automatically implementing 946 a remediated email authentication configuration based on the investigation 942 of email-related cyber threats. For example, referring now to FIGS. 1 and 11, the subject entity 502 may be an entity $1010_1$ contracting with a cyber risk management provider (i.e., a tenant entity $1010_1$). The cyber risk management provider server 1002 may have write access to at least some of the tenant entity's $1010_1$ cyber assets $1012_1$, $1012_2$, . . . $1012_n$, thereby enabling the cyber risk management provider to cause an update to an email configuration associated with a domain of the tenant entity $1010_1$. In response to identifying a domain comprising an email configuration that lacks an authentication method or an email configuration that has a misconfigured authentication method, the cyber risk management provider server 1002 can automatically generate instructions that are sent (e.g. via a network 1008) to a cyber asset 1012 of the tenant entity $1010_1$. The instructions can cause an automated update to the email configuration associated with the identified domain. The remediated email authentication configuration can comprise a new email authentication configuration and/or a corrected email authentication configuration.

Still referring to FIGS. 1 and 11, in various aspects, generating 944 one or more cyber risk mitigation actions can comprise applying 948 automated labeling based on the investigation 942 for email-related cyber threats. For example, a tenant entity $1010_1$ may be contracting with a cyber risk management provider to conduct a cyber security risk analysis of other entities $1010_2$ . . . $1010_n$. The subject entity 502 may be one of the other entities $1010_2$ . . . $1010_n$ that is being analyzed by the cyber risk management provider. The cyber risk management provider server 1002 may have write access to at least some of tenant entity's $1010_1$ cyber assets $1012_1$, $1012_2$, . . . $1012_n$, thereby enabling the cyber risk management provider to cause an update to an email configuration associated with a domain of the tenant entity $1010_1$. In response to identifying a domain (e.g., a cyber asset 1014 of one of the other entities $1010_2$) comprising an email configuration that lacks an authentication method or an email configuration that has a misconfigured authentication, the cyber risk management provider server 1002 can automatically generate instructions that are sent (e.g. via a network 1008) to a cyber asset 1012 of the tenant entity $1010_1$. The instructions can cause the cyber asset 1012 of the tenant entity $1010_1$ to apply automated labeling to emails received by the tenant entity $1010_1$ from the exposed domain (e.g. cyber asset 1014) of the other entity $1010_2$. In some aspects, automated labeling may be applied to emails received from all domains (all cyber assets $1014_1$, $1014_2$, . . . $1014_n$) in the entity domain database 550 of the other entity $1010_2$. The automated labeling may be text added to the received email indicating that the mail may not be authentic.

Still referring to FIGS. 1 and 11, in various aspects, generating 944 one or more cyber risk mitigation actions can comprise refusing to receive and/or quarantining 950 received emails based on the investigation 942 for email-related cyber threats. For example, cyber risk management provider server 1002 may automatically generate instructions that are sent (e.g. via a network 1008) to a cyber asset 1012 (e.g. an email server) of the tenant entity $1010_1$ causing the cyber asset 1012 refuse receipt of emails sent from the exposed domain (e.g. cyber asset 1014) of another entity $1010_2$. In some aspects, the instructions can cause a cyber asset 1012 of the tenant entity $1010_1$ to quarantine emails received from the exposed domain (e.g. cyber asset 1014) of the entity $1010_2$. This may enable the quarantine emails to be investigated for authenticity.

Still referring to FIGS. 1 and 11, in various aspects, generating 944 one or more cyber risk mitigation actions can comprise generating 952 an alert based on the investigation 942 for email-related cyber threats. The alert can be sent to the cyber risk management provider or another party charged with managing the cyber assets of a particular tenant entity $1010_1$. In some aspects, the alert can comprise a message indicating, for example, a compromised email configuration has been detected, a potentially inauthentic email has been sent, and/or a potentially inauthentic mail has been received. In some aspects, the alert can comprise instructions to take a specific action in response to the identified email-related cyber threat.

Still referring to FIGS. 1 and 11, in various aspects, generating 944 one or more cyber risk mitigation actions can comprise generating a cyber threat database 954 based on the investigation 942 for email-related cyber threats. The cyber threat database 954 can comprise a log of each of the domains from entity domain database 550 that has been identified as being exposed to an email-related cyber threat. The cyber threat database 954 or portions thereof may be referenced by a security analyst of the cyber risk management provider or another party charged with managing the cyber assets of a particular tenant entity $\mathbf{1010}_1$. For example, the cyber threat database can be used to identify domains that need email configuration updates.

Still referring to FIGS. 1 and 11, in various aspects, generating 944 one or more cyber risk mitigation actions can comprise generating a cyber security risk report 956 based on the investigation 942 for email-related cyber threats. The cyber security risk report 956 can comprise an evaluation of the cyber threat exposure of the subject entity 502 (e.g., a tenant entity $\mathbf{1010}_1$ or another entity $\mathbf{1010}_2, \ldots \mathbf{1010}_n$) based on the identified email-related cyber threats. For example, an entity's use of email authentication can be an important factor in evaluating how well the entity's cyber assets are protected against cyber threats such as malicious email forgeries.

Referring again primarily to FIG. 11, in various aspects, the entity domain database 550 can comprise domains that are associated with (e.g., that address or otherwise identify) computers that are owned, controlled, or used by the subject entity 502. Thus, referring to FIG. 11, the domain database 904 can be investigated 958 for host configuration-related security threats. A host configuration-related threat can comprise an insecure configuration and/or operation of a computer associated with a domain in the domain database 550. There are numerous types of computing services and implementations of computing services that may cause an insecure configuration or operation of a computer, and the list is ever expanding. Additionally, there are numerous Internet ports and related services that can be scanned for host-related security threats.

As just one example, investigating 958 for host configuration-related security threats can comprise visiting the one or more server(s) associated with a subject entity 502 (e.g. "www.example.com") and searching for information such as the server type, software release version, available encryption parameters, or other security-relevant information presented by the server. This information can be analyzed to identify security threats such as, for example, running a server with a known security vulnerability, using deprecated cryptographic services, or failing to control access to sensitive information.

As another example, investigating 958 for host configuration-related security threats can comprise identifying inherently insecure non-web server services employed on host computers associated with domains in entity domain database 550. These threats may be identified by searching for the service, software release version, available encryption parameters, or other security-relevant information. Insecure services can comprise, for example, older versions of telnet (e.g., a computer addressable as "telnet.example.com") which transmit usernames and passwords without encryption or open databases of sensitive information. See *Unprotected Elasticsearch Server Leaks 5 Billion Records*, CISOMAG (Mar. 20, 2020), incorporated by reference herein in its entirety. Additionally, insecure services can comprise, for example, a file transfer protocol (FTP) server found at "ftp.example.com". FTP is known to suffer numerous security vulnerabilities. See Nate Lord, *What is FTP Security? Securing FTP Usage*, Digital Guardian (Sep. 7, 2018), incorporated by reference herein in its entirety. Thus, investigating 958 for host configuration-related security threats may comprise analyzing the host computers associated with domains in entity domain database 550 for the use of insecure configurations or operations.

Still referring to FIG. 11, the method 900 can continue by generating 960 one or more cyber risk mitigation actions based on the host configuration-related cyber threats identified at 958. The various actions that can be generated 960 comprise, for example, automatically implementing 962 a remediated host configuration, generating 964 an alert, generating a cyber threat database 954, and/or generating a cyber security risk report 956.

Referring again to FIGS. 1 and 11, in various aspects, generating 960 one or more cyber risk mitigation actions can comprise automatically implementing 962 a remediated host configuration based on the investigation 958 for host configuration-related cyber threats. For example, as explained above, the subject entity 502 may be an entity $\mathbf{1010}_1$ contracting with a cyber risk management provider (i.e., a tenant entity $\mathbf{1010}_1$). The cyber risk management provider server 1002 may have write access to at least some of the tenant entity's $\mathbf{1010}_1$ cyber assets $\mathbf{1012}_1, \mathbf{1012}_2, \ldots \mathbf{1012}_n$, thereby enabling the cyber risk management provider to cause an update to a configuration of a host computer associated with a domain of the tenant entity $\mathbf{1010}_1$. In response to identifying a domain associated with a host computer employing an insecure configuration, the cyber risk management provider server 1002 may automatically generate instructions that are sent (e.g. via a network 1008) to a cyber asset 1012 of the tenant entity $\mathbf{1010}_1$. The instructions can cause an automated update to the configuration of the host computer associated with the identified domain. The remediated host configuration can comprise, for example, a new version of the insecure host configuration or a replacement service for the insecure host configuration.

Still referring to FIGS. 1 and 11, in various aspects, generating 960 one or more cyber risk mitigation actions can comprise generating 964 an alert based on the investigation 958 for host configuration-related cyber threats. The alert can be sent to the cyber risk management provider or another party charged with managing the cyber assets of a particular tenant entity $\mathbf{1010}_1$. In some aspects, the alert can comprise a message indicating, for example, an insecure host configuration has been detected, a computer using an insecure host configuration has been used to send or receive information, and/or a domain associated with a computer using an insecure host configuration has been communicated with. In some aspects, the alert can comprise instructions to take a specific action in response to the identified host configuration-related cyber threat.

Still referring to FIGS. 1 and 11, in various aspects, generating 960 one or more cyber risk mitigation actions can comprise generating a cyber threat database 954 based on the investigation 942 for host configuration-related cyber threats. The cyber threat database 954 can comprise a log of each of the domains from entity domain database 550 that has been identified as being exposed to a host configuration-related cyber threat. The cyber threat database 954 or portions thereof may be referenced by a security analyst of the cyber risk management provider or another party charged with managing the cyber assets of a particular tenant entity 1010$_1$. For example, the cyber threat database can be used to identify domains associated with insecure host configurations that need to be updated.

Still referring to FIGS. 1 and 11, in various aspects, generating 960 one or more cyber risk mitigation actions can comprise generating a cyber security risk report 956 based on the investigation 942 for host configuration-related cyber threats. The cyber security risk report 956 can comprise an evaluation of the cyber threat exposure of the subject entity 502 (e.g., a tenant entity 1010$_1$ or another entity 1010$_2$, . . . 1010$_n$) based on the identified host configuration-related cyber threats.

Referring again primarily to FIG. 11, in various aspects, the entity domain database 550 can comprise domains that are associated with (e.g., that address or identify) computers that are owned, controlled, or otherwise used by the subject entity 502. These computers may attempt to send data to or receive data from malicious actors (e.g., groups or individuals with malicious intent such as accessing or destroying data). Thus, referring to FIG. 11, the entity domain database 550 can be investigated 966 for traffic-related security threats. To investigate 966 for traffic-related security threats, data related to public discoveries of malicious actors 968 and/or data related to proprietary discoveries of malicious actors 970 can be searched to identify domains, IP addresses, modus operandi, or other indicators that can be used to identify a malicious actor. Then, cyber assets of the subject entity 502 (e.g., a domain in the entity domain database 550, a computer associated with a domain in the entity domain database 550) can be monitored for communications with the malicious actor.

To identify traffic-related cyber threats involving malicious inbound traffic, investigating 966 for traffic-related cyber threats can comprise identifying domains or IP addresses associated with malicious actors that are sending or attempting to send data to a domain in entity domain database 550. For example, an IP address "1.2.3.4" may be known to be associated with a malicious actor based on data related to public discoveries of malicious actors 968 and/or data related to proprietary discoveries of malicious actors 970. IP address "1.2.3.4" may be observed as requesting a DNS lookup for or attempting to connect to the IP address of the domain "ftp.example.com," an associated domain 922 in entity domain database 550. Based on this request, the associated domain 922 "ftp.example.com" and/or the subject entity 502 can be identified with some confidence as a potential target-of-interest of the malicious actor. If more interactions between "ftp.example.com" and IP address "1.2.3.4" are observed, then the likelihood that the domain "ftp.example.com" and/or the subject entity 502 is a potential target-of-interest may increase. As another example, network data, such as netflow logs or packet captures, may be used to observe temporally long Internet connections between a malicious actor's IP address and a computer associated with an associated domain 922, such as "payroll.example.com." Based on this network data, the associated domain 922 ("payroll.example.com") and/or the subject entity 502 can be identified with some confidence as a potential target-of-interest of a malicious actor.

To identify traffic-related cyber threats involving malicious outbound traffic, investigating 966 for traffic-related cyber threats can comprise identifying a computer associated with a domain in entity domain database 550 that is attempting to connect with domains or IP addresses associated with malicious actors. For example, the IP address of the domain "evilhackercontroller.com" may be known to be associated with a malicious actor based on data related to public discoveries of malicious actors 968 and/or data related to proprietary discoveries of malicious actors 970. A computer acting as a boundary DNS resolver that is linked to an associated domain 922, such as "dns.example.com," may be observed requesting the IP address of the domain "evilhackercontroller.com." Based on this request, the associated domain 922 "example.com" and/or the subject entity 502 can be identified with a high level of confidence as the target of a malicious actor.

Still referring to FIG. 11, the method 900 can continue by generating 972 one or more cyber risk mitigation actions based on the identified traffic-related cyber threats. The various actions that can be generated 972 comprise, for example, automatically implementing 974 a remediated configuration, generating 976, generating a cyber threat database 954, and/or generating a cyber security risk report 956.

Referring again to FIGS. 1 and 11, in various aspects, generating 972 one or more cyber risk mitigation actions can comprise automatically implementing 974 a remediated host configuration based on the investigation 966 for traffic-related cyber threats. For example, as explained above, the subject entity 502 may be an entity 1010$_1$ contracting with a cyber risk management provider (i.e., a tenant entity 1010$_1$). The cyber risk management provider server 1002 may have write access to at least some of the tenant entity's 1010$_1$ cyber assets 1012$_1$, 1012$_2$, . . . 1012$_n$, thereby enabling the cyber risk management provider to cause an update to a computer associated with a domain of the tenant entity 1010$_1$. In response to identifying a domain associated with a computer that is the subject of a traffic-related cyber threat, the cyber risk management provider server 1002 may automatically generate instructions that are sent (e.g. via a network 1008) to a cyber asset 1012 of the tenant entity 1010$_1$. The instructions can cause an automated update to the configuration of the computer associated with the targeted domain. The remediated configuration can comprise, for example, a termination of the connection or blocking an attempted connection between the targeted domain and the malicious actor.

Still referring to FIGS. 1 and 11, in various aspects, generating 972 one or more cyber risk mitigation actions can comprise generating 976 an alert based on the investigation 966 for traffic-related cyber threats. The alert can be sent to the cyber risk management provider or another party charged with managing the cyber assets of a particular tenant entity 1010$_1$.

Still referring to FIGS. 1 and 11, in various aspects, generating 972 one or more cyber risk mitigation actions can comprise generating a cyber threat database 954 based on the investigation 966 for traffic-related cyber threats. The cyber threat database 954 can comprise a log of each of the domains from entity domain database 550 that has been identified as being exposed to a traffic-related cyber threat. The cyber threat database 954 or portions thereof may be referenced by a security analyst of the cyber risk management provider or another party charged with managing the cyber assets of a particular tenant entity 1010$_1$. For example, the cyber threat database can be used to identify domains associated with insecure host configurations that need to be updated.

Still referring to FIGS. 1 and 11, in various aspects, generating 972 one or more cyber risk mitigation actions can comprise generating a cyber security risk report 956 based on the investigation 966 for traffic-related cyber threats. The cyber security risk report 956 can comprise an evaluation of the cyber threat exposure of the subject entity 502 (e.g., a tenant entity $\mathbf{1010}_1$ or another entity $\mathbf{1010}_2$, . . . $\mathbf{1010}_n$) based on the identified traffic-related cyber threats.

Referring again to FIG. 5, the non-routine method of (i) executing 304 a plurality of cyber asset identification algorithms to identify a plurality of candidate match pairs 306, wherein each match pair 306 includes two cyber assets identified by at least one of the cyber asset identification algorithms as potential assets of the same entity, (ii) determining 308 a true match probability $P_T$ for each candidate match pair 306, wherein the true match probability $P_T$ is the probability that the two cyber assets in the candidate match pair 306 are assets of the same entity, and wherein the true match probability $P_T$ is based on which of the cyber asset identification algorithms identified the candidate match pair, (iii) determining 310, for at least some of the candidate match pairs 306, that the true match probability $P_T$ is above a predetermined threshold, and (iv) adding 312 at least one of the cyber assets from each candidate match pair 306 having a true match probability $P_T$ above the predetermined threshold to a cyber asset database 116 corresponding to the entity used to identify the match pair 306 can allow for the more accurate and complete identification of cyber assets owned or otherwise controlled by a particular entity.

Additionally, this non-routine method performs a task at a scale that cannot be practically performed in the human mind—the method 300 can execute 304 a plurality of different cyber asset (e.g., domain) identification algorithms to discover which of the hundreds of millions of existing domains and/or other cyber assets are potential assets of a particular entity. Moreover, the true match probabilities $P_T$ employed in this non-routine method may be calculated using one or more accuracy factors associated with each cyber asset identification algorithm. In some aspects, machine learning techniques can be used to provide the technological advantage of determining accuracy factor(s) for each of the cyber asset identification algorithms to allow for more accurate cyber asset classification based on training using ground truth cyber assets. Yet further, referring to FIGS. 3 and 5, the generation of cyber asset databases 116 is integrated into a practical application by generating 208 one or more cyber risk mitigation actions (e.g., implementing 214 remediation action, generating 216 an alert, generating cyber security risk reports 210, generating cyber asset threat, vulnerability, and risk database 212). Similarly, referring to FIG. 11, the generation of the entity domain database 550 is integrated into a practical application by generating 944, 960, 972 one or more automated cyber risk mitigation actions (e.g., implementing 946, 962, 974 remediated configurations, generating 952, 964, 976 alerts, generating cyber security risk report 956, and generating cyber threat database 954).

Figure 12:
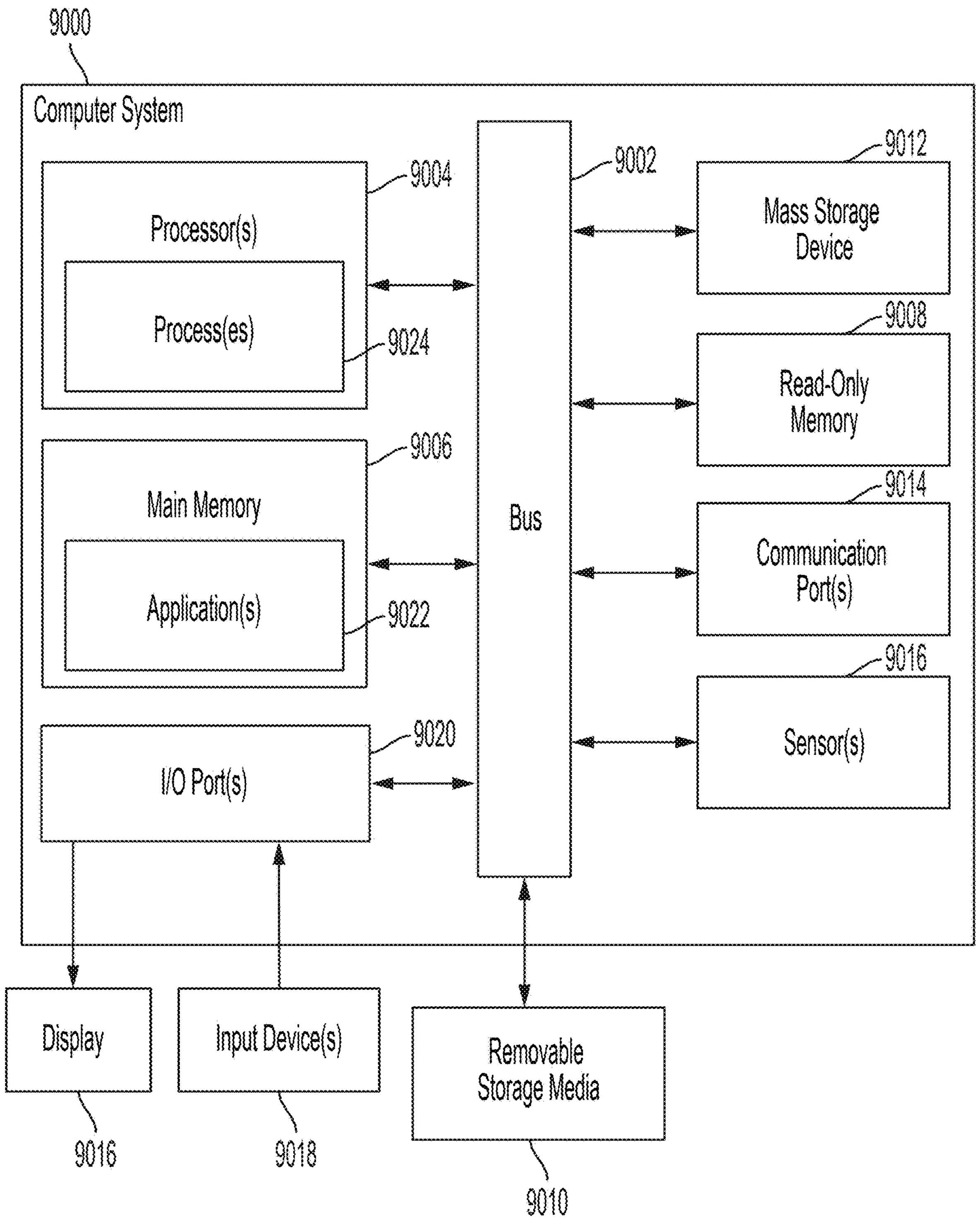
FIG. 12 illustrates a diagram of a computing system, in accordance with at least one non-limiting aspect of the present disclosure.

Referring now to FIG. 12, a diagram of a computing system 9000 is illustrated, in accordance with at least one non-limiting aspect of the present disclosure. The computing system 9000 and the various components comprised therein, as described below, may be used to implement various components of the system 1000, 2000 described hereinabove in connection with FIGS. 1 and 4 and/or may be used to store and execute instructions for any of the various methods described hereinabove in connection with FIGS. 2-3 and 5-11.

According to the non-limiting aspect of FIG. 12, the computer system 9000 may include a bus 9002 (i.e., interconnect), one or more processors 9004, a main memory 9006, read-only memory 9008, removable storage media 9010, mass storage 9012, and one or more communications ports 9014. As should be appreciated, components such as removable storage media are optional and are not necessary in all systems. Communication port 9014 may be connected to one or more networks by way of which the computer system 9000 may receive and/or transmit data.

As used herein, a "processor" can mean one or more microprocessors, central processing units (CPUs), computing devices, microcontrollers, digital signal processors, graphics processing units (GPUs) or like devices or any combination thereof, regardless of their architecture. An apparatus that performs a process can include, e.g., a processor and those devices such as input devices and output devices that are appropriate to perform the process.

Processor(s) 9004 can be any known processor, such as, but not limited to, processors manufactured by and/or sold by INTEL®, AMD®, or MOTOROLA®, and the like, that are generally well-known to one skilled in the relevant art and are well-defined in the literature. Communications port(s) 9014 can be any of an RS-232 port for use with a modem based dial-up connection, a 10/100 Ethernet port, a Gigabit port using copper or fiber, or a USB port, and the like. Communications port(s) 9014 may be chosen depending on a network such as a Local Area Network (LAN), a Wide Area Network (WAN), a CDN, or any network to which the computer system 9000 connects. The computer system 9000 may be in communication with peripheral devices (e.g., display screen 9016, input device(s) 9018) via Input/Output (I/O) port 9020.

Main memory 9006 can be Random Access Memory (RAM), or any other dynamic storage device(s) commonly known in the art. Read-only memory 9008 can be any static storage device(s) such as Programmable Read-Only Memory (PROM) chips for storing static information such as instructions for processor 9004. Mass storage 9012 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 9002 communicatively couples processor(s) 9004 with the other memory, storage, and communications blocks. Bus 9002 can be a PCI/PCI-X, SCSI, a Universal Serial Bus (USB) based system bus (or other) depending on the storage devices used, and the like. Removable storage media 9010 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Aspects described herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, aspects described herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art. A computer-readable medium can store (in any appropriate format) those program elements that are appropriate to perform the methods.

As shown, main memory 9006 is encoded with application(s) 9022 that supports the functionality discussed herein (the application 9022 may be an application that provides some or all of the functionality of the CD services described herein, including the client application). Application(s) 9022 (and/or other resources as described herein) can be embodied as software code such as data and/or logic instructions (e.g., code stored in the memory or on another computer readable medium such as a disk) that supports processing functionality according to different aspects described herein.

During operation of one aspect, processor(s) 9004 accesses main memory 9006 via the use of bus 9002 in order to launch, run, execute, interpret or otherwise perform the logic instructions of the application(s) 9022. Execution of application(s) 9022 produces processing functionality of the service related to the application(s). In other words, the process(es) 9024 represents one or more portions of the application(s) 9022 performing within or upon the processor(s) 9004 in the computer system 9000.

It should be noted that, in addition to the process(es) 9024 that carries (carry) out operations as discussed herein, other processes described herein include the application 9022 itself (i.e., the un-executed or non-performing logic instructions and/or data). The application 9022 may be stored on a computer readable medium (e.g., a repository) such as a disk or in an optical medium. According to other aspects, the application 9022 can also be stored in a memory type system such as in firmware, read only memory (ROM), or, as in this example, as executable code within the main memory 9006 (e.g., within Random Access Memory or RAM). For example, application 9022 may also be stored in removable storage media 9010, read-only memory 9008 and/or mass storage device 9012.

Those skilled in the art will understand that the computer system 9000 can include other processes and/or software and hardware components, such as an operating system that controls allocation and use of hardware resources.

Various aspects of the subject matter described herein are set out in the following numbered clauses:

Clause 1: A method for identifying cyber assets and implementing cyber risk mitigation actions, the method comprising: selecting a subject entity for evaluation; executing a plurality of domain identification algorithms to identify a plurality of candidate domains, wherein each candidate domain is identified by at least one of the domain identification algorithms as a potential asset of the subject entity; determining a true match probability for each candidate domain, wherein the true match probability is the probability that the candidate domain is an asset of the subject entity, and wherein the true match probability is based on which of the domain identification algorithms identified the candidate domain; classifying the candidate domains having a true match probability above a predetermined threshold as associated domains, wherein each associated domain is considered to be an asset of the subject entity; generating an entity asset database for the subject entity based on the associated domains; and generating a cyber risk mitigation action based on the entity asset database.

Clause 2: The method of clause 1, wherein the true match probability is further based on a plurality of accuracy factors, wherein each accuracy factor corresponds to one of the domain identification algorithms.

Clause 3: The method of any of clauses 1-2, wherein determining the true match probability for each candidate domain comprises: assigning a binary value to each domain identification algorithm, wherein a one is assigned to each domain identification algorithm that identified the candidate domain, and wherein a zero is assigned to each domain identification algorithm that did not identify the candidate domain; and calculating the true match probability based on the binary value assigned to each domain identification algorithm and the accuracy factor for each domain identification algorithm.

Clause 4: The method of any of clauses 1-3, further comprising determining the accuracy factors, wherein determining the accuracy factors comprises: selecting a known entity; identifying ground truth domains for the known entity, wherein the ground truth domains are domains that are known to be assets of the known entity; executing the plurality of domain identification algorithms to identify a plurality of training domains, wherein each training domain is identified by at least one of the domain identification algorithms as a potential asset of the known entity, and wherein each domain identification algorithm identifies a subset of the training domains; and comparing the subset of training domains identified by each domain identification algorithm to the ground truth domains.

Clause 5: The method of any of clauses 1-4, wherein determining the accuracy factors further comprises employing a machine learning technique to determine an accuracy factor for each domain identification algorithm based on the comparison of each subset of training domains to the ground truth domains.

Clause 6: The method of any of clauses 1-5, wherein employing the machine learning technique comprises employing a support vector machine (SVM) model.

Clause 7: The method of any of clauses 1-6, wherein each of the plurality of domain identification algorithms employ a different method of identifying candidate domains.

Clause 8: The method of any of clauses 1-7, wherein executing the plurality of domain identification algorithms to identify the plurality of candidate domain comprises: identifying a seed domain of the subject entity; and identifying, by each of the domain identification algorithms, domains that are potentially associated with the same entity as the seed domain.

Clause 9: The method of any of clauses 1-8, wherein executing the plurality of domain identification algorithms to identify the plurality of candidate domain comprises: identifying a seed domain of the subject entity; and searching, by at least one of the domain identification algorithms, public data, proprietary data, or a combination thereof to identify domains having at least some of the same registration information as the seed domain.

Clause 10: The method of any of clauses 1-9, wherein executing the plurality of domain identification algorithms to identify the plurality of candidate domain further comprises: applying a filter, by the at least one of the domain identification algorithms, to exclude some of the identified domains having at least some of the same registration information as the seed domain from being identified as candidate domains.

Clause 11: The method of any of clauses 1-10, wherein applying the filter comprises excluding domains comprising redacted registration data.

Clause 12: The method of any of clauses 1-11, further comprising: investigating the entity asset database to identify associated domains linked to a device comprising an insecure host configuration; wherein generating a cyber risk mitigation action based on the entity asset database comprises: automatically implementing a remediated host configuration when a device comprising an insecure host configuration is identified; generating a security alert when an associated domain linked to a device comprising an insecure host configuration is identified; or generating a cyber security risk report based on the investigation of the entity asset database; or a combination thereof.

Clause 13: The method of any of clauses 1-12, further comprising: investigating the entity asset database to identify associated domains linked to a device communicating with a malicious actor; wherein generating a cyber risk mitigation action based on the entity asset database comprises: automatically implementing a remediated device communication configuration when communicating with a malicious actor is identified; generating a security alert when an associated domain linked to a device communicating with a malicious actor is identified; or generating a cyber security risk report based on the investigation of the entity asset database; or a combination thereof.

Clause 14: The method of any of clauses 1-13, further comprising: investigating the entity asset database to identify associated domains comprising an email-related security threat; wherein the email-related security threat comprises an email configuration lacking an email authentication method and/or an email configuration with a misconfigured email authentication method; and wherein generating a cyber risk mitigation action based on the entity asset database comprises: automatically implementing a remediated email authentication configuration when an associated domain comprising an email-related security threat is identified; generating an automated label indicating that an email may not be authentic when received from an associated domain comprising an email-related security threat; quarantining an email when received from an associated domain comprising an email-related security threat; generating a security alert when an associated domain comprising an email-related security threat is identified; or generating a cyber security risk report based on the investigation of the entity asset database; or a combination thereof.

Clause 15: A method for identifying cyber assets and implementing cyber risk mitigation actions, the method comprising: executing a plurality of cyber asset identification algorithms to identify a plurality of candidate match pairs, wherein each candidate match pair comprises two cyber assets identified by at least one of the cyber asset identification algorithms as potential assets of the same entity; determining a true match probability for each candidate match pair, wherein the true match probability is the probability that the two cyber assets in the candidate match pair are assets of the same entity, and wherein the true match probability is based on which of the cyber asset identification algorithms identified the candidate match pair; determining, for at least some of the candidate match pairs, that the true match probability is above a predetermined threshold; adding at least one of the cyber assets from each candidate match pair having a true match probability above the predetermined threshold to a cyber asset database corresponding to the entity used to identify the match pair; and generating a cyber risk mitigation based on the cyber asset database.

Clause 16: The method of clause 15, wherein determining the true match probability for each match pair comprises: assigning a binary value to each cyber asset identification algorithm, wherein a one is assigned to each cyber asset identification algorithm that identified the match pair, and wherein a zero is assigned to each cyber asset identification algorithm that did not identify the match pair; and calculating the true match probability based on the binary value assigned to each cyber asset identification algorithm and the accuracy factor for each cyber asset identification algorithm.

Clause 17: The method of any of clauses 15-16, wherein determining the true match probability for each match pair comprises: assigning a binary value to each cyber asset identification algorithm, wherein a one is assigned to each cyber asset identification algorithm that identified the match pair, and wherein a zero is assigned to each cyber asset identification algorithm that did not identify the match pair; and calculating the true match probability based on the binary value assigned to each cyber asset identification algorithm and the accuracy factor for each cyber asset identification algorithm.

Clause 18: The method of any of clauses 15-17, further comprising determining the accuracy factor for each cyber asset identification algorithm, wherein determining the accuracy factor for each cyber asset identification algorithm comprises: selecting a known entity; identifying ground truth cyber assets for the known entity, wherein the ground truth cyber assets are cyber assets that are known to be assets of the known entity; executing the plurality of cyber asset identification algorithms to identify a plurality of training match pairs, wherein each training match pair comprises two cyber assets identified by at least one of the cyber asset identification algorithms as a potential assets of the known entity, and wherein each cyber asset identification algorithm identifies a subset of the training match pairs; and comparing the subset of training match pairs identified by each cyber asset identification algorithm to the ground truth cyber assets.

Clause 19: The method of any of clauses 15-18, wherein determining the accuracy factor for each cyber asset identification algorithm further comprises employing a machine learning technique to determine the correctness factor for each cyber asset identification algorithm based on the comparison of each subset of training match pairs to the ground truth cyber assets.

Clause 20: The method of any of clauses 15-19, wherein employing the machine learning technique comprises employing a support vector machine (SVM) model.

Clause 21: The method of any of clauses 15-20, wherein each of the plurality of cyber asset identification algorithms employ a different method of identifying candidate match pairs.

Clause 22: A server configured to identify cyber assets and implement cyber risk mitigation based on a democratic matching algorithm, wherein the server comprises a processer and a memory configured to generate a footprinting module and a risk mitigation module, wherein the footprinting module comprises a democratic matching module and a plurality of cyber asset identification modules, and wherein the memory stores instructions that, when executed by the processor, cause the processor to: execute, via the cyber asset identification modules, a plurality of cyber asset identification algorithms to identify a plurality of candidate match pairs, wherein each candidate match pair comprises two cyber assets identified by at least one of the cyber asset identification algorithms as potential assets of the same entity; determine, via the democratic matching module, a true match probability for each candidate match pair, wherein the true match probability is the probability that the two cyber assets in the candidate match pair are assets of the same entity, and wherein the true match probability is based on which of the cyber asset identification algorithms identified the candidate match pair; determine, via the democratic matching module, for at least some of the candidate match pairs, that the true match probability is above a predetermined threshold; add, via the footprinting module, at least one of the cyber assets from each candidate match pair having a true match probability above the predetermined threshold to a cyber asset database corresponding to the entity used to identify the match pair; and generate, via the risk mitigation module, a cyber risk mitigation based on the cyber asset database.

Clause 23: The server of Clause 22, wherein the true match probability is further based on an accuracy factor associated with each cyber asset identification algorithm.

Clause 24: The server of any of Clauses 22-23, wherein the instructions to determine the true match probability for each match pair comprises instructions that, when executed by the processer, cause the processor to: assign, via the democratic matching module, a binary value to each cyber asset identification algorithm, wherein a one is assigned to each cyber asset identification algorithm that identified the match pair, and wherein a zero is assigned to each cyber asset identification algorithm that did not identify the match pair; and calculate, via the democratic matching module, the true match probability based on the binary value assigned to each cyber asset identification algorithm and the accuracy factor for each cyber asset identification algorithm.

Clause 25: The server of any of Clauses 22-25, wherein the footprinting module further comprises a training module, wherein the memory stores instructions that, when executed by the processer, cause the processor to determine, via the training module, the accuracy factor for each cyber asset identification algorithm, and wherein the instructions to cause the processor to determine the accuracy factor for each cyber asset identification algorithm comprise instructions to cause the processor to: select a known entity; identify ground truth cyber assets for the known entity, wherein the ground truth cyber assets are cyber assets that are known to be assets of the known entity; execute the plurality of cyber asset identification algorithms to identify a plurality of training match pairs, wherein each training match pair comprises two cyber assets identified by at least one of the cyber asset identification algorithms as a potential assets of the known entity, and wherein each cyber asset identification algorithm identifies a subset of the training match pairs; and compare the subset of training match pairs identified by each cyber asset identification algorithm to the ground truth cyber assets.

Clause 26: The server of any of Clauses 22-25, wherein the instructions to determine the accuracy factor for each cyber asset identification algorithm further comprise instructions to employ a machine learning technique to determine the correctness factor for each cyber asset identification algorithm based on the comparison of each subset of training match pairs to the ground truth cyber assets.

Clause 27: The server of any of Clauses 22-26, wherein the instructions to employ the machine learning technique comprise instructions to employ a support vector machine (SVM) model.

Clause 28: The server of any of Clauses 22-27, wherein each of the plurality of cyber asset identification algorithms employ a different method of identifying candidate match pairs.

Clause 29: A system and method for cyber risk mitigation substantially as disclosed and described herein.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference, and the disclosure expressly set forth in the present application controls.

Various exemplary, and illustrative aspects have been described. The aspects described herein are understood as providing illustrative features of varying detail of various aspects of the present disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the present disclosure. Accordingly, it will be recognized by persons having ordinary skill in the art that various substitutions, modifications, or combinations of any of the exemplary aspects may be made without departing from the scope of the claimed subject matter. In addition, persons skilled in the art will recognize, or be able to ascertain using no more than routine experimentation, many equivalents to the various aspects of the present disclosure upon review of this specification. Thus, the present disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one", and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one", and indefinite articles such as "a" or "an" (e.g., "a", and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A, and B together, A, and C together, B, and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A, and B together, A, and C together, B, and C together, and/or A, B, and C together, etc.). It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A, and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification,", and the like means that a particular feature, structure, or characteristic described in connection with the aspect is included in at least one aspect. Thus, appearances of the phrases "in one aspect," "in an aspect," "in an exemplification,", and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example, and without limitation, top, bottom, left, right, lower, upper, front, back, and variations thereof, shall relate to the orientation of the elements shown in the accompanying drawing, and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced, and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits, and by applying ordinary rounding techniques.

Any numerical range recited herein includes all sub-ranges subsumed within the recited range. For example, a range of "1 to 100" includes all sub-ranges between (and including) the recited minimum value of 1, and the recited maximum value of 100, that is, having a minimum value equal to or greater than 1, and a maximum value equal to or less than 100. Also, all ranges recited herein are inclusive of the end points of the recited ranges. For example, a range of "1 to 100" includes the end points 1, and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification, and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material, and the existing disclosure material.

The terms "comprise" (and any form of comprise, such as "comprises", and "comprising"), "have" (and any form of have, such as "has", and "having"), "include" (and any form of include, such as "includes", and "including"), and "contain" (and any form of contain, such as "contains", and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The foregoing detailed description has set forth various forms of the devices, and/or processes via the use of block diagrams, flowcharts, and/or examples. Insofar as such block diagrams, flowcharts, and/or examples contain one or more functions, and/or operations, it will be understood by those within the art that each function, and/or operation within such block diagrams, flowcharts, and/or examples can be implemented, individually, and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry, and/or writing the code for the software, and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein, "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes, and/or devices described herein, or a microprocessor configured by a computer program which at least partially carries out processes, and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware, and/or circuitry configured to perform any of the aforementioned operations. Software may be embodied as a software package, code, instructions, instruction sets, and/or data recorded on non-transitory computer readable storage medium. Firmware may be embodied as code, instructions or instruction sets, and/or data that are hard-coded (e.g., nonvolatile) in memory devices.

As used in any aspect herein, the terms "component," "system," "module", and the like can refer to a computer-related entity, either hardware, a combination of hardware, and software, software, or software in execution.

As used in any aspect herein, an "algorithm" refers to a self-consistent sequence of steps leading to a desired result, where a "step" refers to a manipulation of physical quantities, and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These, and similar terms may be associated with the appropriate physical quantities, and are merely convenient labels applied to these quantities, and/or states.

What is claimed is:

1. A method for identifying cyber assets and implementing cyber risk mitigation actions, the method comprising:

selecting a subject entity for evaluation;

executing a plurality of domain identification algorithms to identify a plurality of candidate domains, wherein the plurality of the domain identification algorithms comprises different domain identification algorithms each employing a different set of rules, parameters, different information source, or a combination of information sources to identify domains of the plurality of candidate domains that are potential assets of the subject entity, and wherein each of the plurality of the candidate domains is identified by at least one of the domain identification algorithms as a potential asset of the subject entity;

determining a plurality of true match probabilities for the plurality of the candidate domains, wherein each of the plurality of the true match probabilities corresponds to a different one of the plurality of the candidate domains, and wherein each of the plurality of the true match probabilities is a probability that a corresponding one of the plurality of the candidate domains is an asset of the subject entity determined based on a number of the plurality of the domain identification algorithms that identified the corresponding one of the plurality of the candidate domains, wherein the number of the plurality of the domain identification algorithms that identified the corresponding one of the plurality of the candidate domains is determined by:

assigning a binary value to each of the plurality of the domain identification algorithms, wherein a one is assigned to each of the plurality of the domain identification algorithms that identified the corresponding one of the plurality of the candidate domains, and wherein a zero is assigned to each of the plurality of the domain identification algorithms that did not identify the corresponding one of the plurality of the candidate domains; and wherein each of the plurality of the true match probabilities is based on the binary value assigned to each of the plurality of the domain identification algorithms;

classifying domains of the plurality of candidate domains having a true match probability above a predetermined threshold as associated domains, wherein each of the associated domains is considered to be an asset of the subject entity;

generating an entity asset database for the subject entity based on the associated domains; and generating a cyber risk mitigation action based on the entity asset database.

2. The method of claim 1, wherein each of the plurality of the true match probabilities is further based on a plurality of accuracy factors corresponding to the plurality of the domain identification algorithms, wherein each of the plurality of the accuracy factors corresponds to one of the plurality of the domain identification algorithms and represents a probability of the corresponding one of the domain identification algorithms returning a true result.

3. The method of claim 2, wherein each of the plurality of the true match probabilities is based on the binary value assigned to each of the plurality of the domain identification algorithms and the plurality of the accuracy factors corresponding to the plurality of the domain identification algorithms.

4. The method of claim 2, further comprising determining the plurality of the accuracy factors, wherein the determining the plurality of the accuracy factors comprises:

selecting a known entity;

identifying ground truth domains for the known entity, wherein the ground truth domains are domains that are known to be assets of the known entity;

executing the plurality of the domain identification algorithms to identify a plurality of training domains, wherein each of the plurality of the training domains is identified by at least one of the plurality of the domain identification algorithms as a potential asset of the known entity, and wherein each of the plurality of domain identification algorithms identifies a subset of the plurality of the training domains; and comparing the subset of the plurality of the training domains identified by each of the plurality of domain identification algorithms to the ground truth domains.

5. The method of claim 4, wherein the determining the plurality of the accuracy factors further comprises employing a machine learning technique to determine an accuracy factor of the plurality of the accuracy factors for each of the plurality of the domain identification algorithms based on the comparing the subset of the plurality of the training domains identified by each of the plurality of the domain identification algorithms to the ground truth domains.

6. The method of claim 5, wherein the employing the machine learning technique comprises employing a support vector machine (SVM) model.

7. The method of claim 1, wherein each of the plurality of domain identification algorithms employs a different method of identifying the candidate domains of the plurality of candidate domains.

8. The method of claim 1, wherein the executing the plurality of the domain identification algorithms to identify the plurality of the candidate domains comprises:

identifying a seed domain of the subject entity; and identifying, by each of the plurality of domain identification algorithms, domains that are potentially associated with the same entity as the seed domain.

9. The method of claim 1, wherein the executing the plurality of the domain identification algorithms to identify the plurality of the candidate domain comprises:

identifying a seed domain of the subject entity; and searching, by at least one of the plurality of domain identification algorithms, public data, proprietary data, or a combination thereof to identify domains having at least some of the same registration information as the seed domain.

10. The method of claim 9, wherein the executing the plurality of the domain identification algorithms to identify the plurality of the candidate domains further comprises:

applying a filter, by the at least one of the plurality of the domain identification algorithms, to exclude some domains identified as having at least some of the same registration information as the seed domain from being identified as candidate domains of the plurality of candidate domains.

11. The method of claim 10, wherein the applying the filter comprises excluding domains comprising redacted registration data.

12. The method of claim 1, further comprising:

investigating the entity asset database to identify associated domains of the plurality of the associated domains linked to a device comprising an insecure host configuration;

wherein the generating a cyber risk mitigation action based on the entity asset database comprises:

automatically implementing a remediated host configuration when a device comprising an insecure host configuration is identified;

generating a security alert when an associated domain of the plurality of the associated domains linked to a device comprising an insecure host configuration is identified; or generating a cyber security risk report based on the investigating the entity asset database to identify associated domains of the plurality of the associated domains linked to a device comprising an insecure host configuration; or a combination thereof.

13. The method of claim 1, further comprising:

investigating the entity asset database to identify associated domains of the plurality of the associated domains linked to a device communicating with a malicious actor;

wherein the generating a cyber risk mitigation action based on the entity asset database comprises:

automatically implementing a remediated device communication configuration when communicating with a malicious actor is identified;

generating a security alert when an associated domain of the plurality of the associated domains linked to a device communicating with a malicious actor is identified; or generating a cyber security risk report based on the investigating the entity asset database to identify associated domains of the plurality of the associated domains linked to a device comprising an insecure host configuration;

or a combination thereof.

14. The method of claim 1, further comprising:

investigating the entity asset database to identify associated domains of the plurality of the associated domains comprising an email-related security threat;

wherein the email-related security threat comprises an email configuration lacking an email authentication method and/or an email configuration with a misconfigured email authentication method; and wherein the generating the cyber risk mitigation action based on the entity asset database comprises:

automatically implementing a remediated email authentication configuration when an associated domain of the plurality of the associated domains comprising an email-related security threat is identified;

generating an automated label indicating that an email may not be authentic when received from an associated domain of the plurality of the associated domains comprising an email-related security threat;

quarantining an email when received from an associated domain of the plurality of the associated domains comprising an email-related security threat;

generating a security alert when an associated domain of the plurality of the associated domains comprising an email-related security threat is identified; or generating a cyber security risk report based on the investigating the entity asset database to identify associated domains of the plurality of the associated domains linked to a device comprising an insecure host configuration;

or a combination thereof.

15. A method for identifying cyber assets and implementing cyber risk mitigation actions, the method comprising:

executing, by cyber asset identification modules, a plurality of cyber asset identification algorithms to identify a plurality of candidate match pairs, wherein the plurality of the cyber asset identification algorithms comprises different cyber asset identification algorithms each employing a different set of rules, parameters, different information source, or a combination of information sources configured to identify candidate match pairs of the plurality of the candidate match pairs, and wherein each of the plurality of the candidate match pairs comprises two cyber assets identified by at least one of the plurality of the cyber asset identification algorithms as potential assets of the same entity;

determining, by a democratic matching module, a plurality of true match probabilities for the plurality of the candidate match pairs, wherein each of the plurality of the true match probabilities corresponds to a different one of the plurality of the candidate match pairs, and wherein each of the plurality of the true match probabilities is a probability that a corresponding one of the plurality of the candidate match pairs comprise two assets of the same entity determined based on a number of the plurality of the cyber asset identification algorithms that identified the corresponding one of the plurality of the candidate match pairs, wherein the number of the plurality of the cyber asset identification algorithms that identified the corresponding one of the plurality of the candidate match pairs is determined by:

assigning, by the democratic matching module, a binary value to each of the plurality of the cyber asset identification algorithms, wherein a one is assigned to each of the plurality of the cyber asset identification algorithms that identified the corresponding one of the plurality of the candidate match pairs, and wherein a zero is assigned to each of the plurality of the cyber asset identification algorithms that did not identify the corresponding one of the plurality of the candidate match pairs; and wherein each of the plurality of the true match probabilities is based on the binary value assigned to each of the plurality of the cyber asset identification algorithms;

determining, by the democratic matching module, at least some of the plurality of candidate match pairs correspond to true match probabilities of the plurality of the true match probabilities that are above a predetermined threshold;

adding, by a footprinting module, at least one of the two cyber assets from each of the candidate match pairs of the plurality of the candidate match pairs corresponding to the true match probabilities of the plurality of the true match probabilities that are above the predetermined threshold to a cyber asset database corresponding to the same entity; and generating, by a risk mitigation module, a cyber risk mitigation based on the cyber asset database.

16. The method of claim 15, wherein each of the plurality of the true match probabilities is further based on a plurality of accuracy factors corresponding to the plurality of cyber asset identification algorithms, wherein each of the plurality of the accuracy factors corresponds to one of the plurality of cyber asset identification algorithms and represents a probability of the corresponding one of the plurality of the cyber asset identification algorithms returning a true result.

17. The method of claim 16, wherein the democratic matching module calculates each of the plurality of the true match probabilities based on the binary value assigned to each of the plurality of the cyber asset identification algorithms and the plurality of the accuracy factors corresponding to the plurality of the cyber asset identification algorithms.

18. The method of claim 16, further comprising determining the plurality of the accuracy factors, wherein the determining the plurality of the accuracy factors comprises:

selecting, by a training module, a known entity;

identifying, by the training module, ground truth cyber assets for the known entity, wherein the ground truth cyber assets are cyber assets that are known to be assets of the known entity;

executing, by the democratic matching modules, the plurality of the cyber asset identification algorithms to identify a plurality of training match pairs, wherein each of the plurality of the training match pairs comprises two cyber assets identified by at least one of the plurality of the cyber asset identification algorithms as potential assets of the known entity, and wherein each of the plurality of cyber asset identification algorithms identifies a subset of the plurality of the training match pairs; and comparing, by the training module, the subset of the plurality of the training match pairs identified by each of the plurality of the cyber asset identification algorithms to the ground truth cyber assets.

19. The method of claim 18, wherein the determining the plurality of the accuracy factors further comprises employing a machine learning technique to determine the accuracy factor of the plurality of the accuracy factors for each of the plurality of the cyber asset identification algorithms based on comparing the subset of the plurality of the training match pairs identified by the each of the plurality of the cyber asset identification algorithms to the ground truth cyber assets.

20. The method of claim 19, wherein the employing the machine learning technique comprises employing a support vector machine (SVM) model.

21. The method of claim 15, wherein each of the plurality of the cyber asset identification algorithms employs a different method of identifying match pairs of the plurality of the candidate match pairs.

22. A server configured to identify cyber assets and implement cyber risk mitigation based on a democratic matching algorithm, wherein the server comprises a processor and a memory configured to generate a footprinting module and a risk mitigation module, wherein the footprinting module comprises a democratic matching module and a plurality of cyber asset identification modules, and wherein the memory stores instructions that, when executed by the processor, cause the processor to:

execute, via the cyber asset identification modules, a plurality of cyber asset identification algorithms to identify a plurality of candidate match pairs, wherein the plurality of the cyber asset identification algorithms comprises different cyber asset identification algorithms that each employ a different set of rules, parameters, different information source, or a combination of information sources configured to identify candidate match pairs of the plurality of the candidate match pairs, and wherein each of the plurality of the candidate match pairs comprises two cyber assets identified by at least one of the plurality of the cyber asset identification algorithms as potential assets of the same entity;

determine, via the democratic matching module, a plurality of true match probabilities for the plurality of the candidate match pairs, wherein each of the plurality of the true match probabilities corresponds to a different one of the plurality of the candidate match pairs, and wherein each of the plurality of the true match probabilities is a probability that a corresponding one of the plurality of the candidate match pairs comprise two assets of the same entity determined based on a number of the plurality of the cyber asset identification algorithms that identified the corresponding one of the plurality of the candidate match pairs, wherein the number of the plurality of the cyber asset identification algorithms that identified the corresponding one of the plurality of the candidate match pairs is determined by:

assigning, via the democratic matching module, a binary value to each of the plurality of the cyber asset identification algorithms, wherein a one is assigned to each of the plurality of the cyber asset identification algorithms that identified the corresponding one of the plurality of the candidate match pairs, and wherein a zero is assigned to each of the plurality of the cyber asset identification algorithms that did not identify the corresponding one of the plurality of the candidate match pairs; and wherein each of the plurality of the true match probabilities is based on the binary value assigned to each of the plurality of the cyber asset identification algorithms;

determine, via the democratic matching module, at least some of the plurality of candidate match pairs correspond to true match probabilities of the plurality of the true match probabilities that are above a predetermined threshold;

add, via the footprinting module, at least one of the two cyber assets from each of the candidate match pairs of the plurality of candidate match pairs corresponding to the true match probabilities of the plurality of the true match probabilities that are above the predetermined threshold to a cyber asset database corresponding to the same entity; and generate, via the risk mitigation module, a cyber risk mitigation based on the cyber asset database.

23. The server of claim 22, wherein each of the plurality of the true match probabilities is further based on a plurality of accuracy factors corresponding to the plurality of cyber asset identification algorithms, wherein each of the plurality of the accuracy factors corresponds to one of the plurality of cyber asset identification algorithms and represents a probability of the corresponding one of the plurality of the cyber asset identification algorithms returning a true result.

24. The server of claim 23, wherein the democratic matching module calculates each of the plurality of the true match probabilities based on the binary value assigned to each of the plurality of the cyber asset identification algorithms and the plurality of the accuracy factors corresponding to the plurality of the cyber asset identification algorithms.

25. The server of claim 23, wherein the footprinting module further comprises a training module, wherein the memory stores instructions that, when executed by the processer, cause the processor to determine, via the training module, the plurality of the accuracy factors f, and wherein the instructions to cause the processor to determine the plurality of the accuracy factors comprise instructions to cause the processor to:

select a known entity;

identify ground truth cyber assets for the known entity, wherein the ground truth cyber assets are cyber assets that are known to be assets of the known entity;

execute the plurality of the cyber asset identification algorithms to identify a plurality of training match pairs, wherein each of the plurality of the training match pairs comprises two cyber assets identified by at least one of the plurality of the cyber asset identification algorithms as potential assets of the known entity, and wherein each of the plurality of cyber asset identification algorithms identifies a subset of the plurality of the training match pairs; and compare the subset of the plurality of the training match pairs identified by each of the plurality of the cyber asset identification algorithms to the ground truth cyber assets.

26. The server of claim 25, wherein the instructions to determine the plurality of the accuracy factors further comprise instructions to employ a machine learning technique to determine the accuracy factor of the plurality of the accuracy factors for each of the plurality of the cyber asset identification algorithms based on comparing the subset of the plurality of the training match pairs identified by the each of the plurality of the cyber asset identification algorithms to the ground truth cyber assets.

27. The server of claim 26, wherein the instructions to employ the machine learning technique comprise instructions to employ a support vector machine (SVM) model.

28. The server of claim 22, wherein each of the plurality of the cyber asset identification algorithms employs a different method of identifying match pairs of the plurality of the candidate match pairs.

* * * * *